US011457172B2

(12) United States Patent
Takahashi et al.

(10) Patent No.: US 11,457,172 B2
(45) Date of Patent: Sep. 27, 2022

(54) INFORMATION PROCESSING DEVICE AND REPRODUCTION CONTROL METHOD

(71) Applicant: PANASONIC i-PRO SENSING SOLUTIONS CO., LTD., Fukuoka (JP)

(72) Inventors: Hideaki Takahashi, Fukuoka (JP); Naoya Sakurai, Fukuoka (JP); Masayuki Hasegawa, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 55 days.

(21) Appl. No.: 16/910,903

(22) Filed: Jun. 24, 2020

(65) Prior Publication Data
US 2020/0413001 A1 Dec. 31, 2020

(30) Foreign Application Priority Data
Jun. 28, 2019 (JP) .............................. JP2019-121135

(51) Int. Cl.
*H04N 5/91* (2006.01)
(52) U.S. Cl.
CPC ..................................... *H04N 5/91* (2013.01)
(58) Field of Classification Search
CPC ........ H04N 5/91; H04N 7/0806; H04N 7/181; H04N 7/183; H04N 7/185; G06F 3/04842
See application file for complete search history.

(56) References Cited

U.S. PATENT DOCUMENTS

| 8,723,952 B1* | 5/2014 | Rozenboim ...... H04N 21/23116 348/143 |
| 2013/0295912 A1* | 11/2013 | Chen ........................ H04N 5/77 455/420 |
| 2016/0227173 A1 | 8/2016 | Yamaguchi et al. |
| 2018/0077390 A1 | 3/2018 | Yamaguchi et al. |
| 2018/0101970 A1* | 4/2018 | Waniguchi ............ G06Q 50/26 |
| 2018/0109754 A1* | 4/2018 | Kwon .................. H04N 7/0806 |
| 2018/0376078 A1* | 12/2018 | Adachi ............. H04N 5/23296 |
| 2019/0110025 A1 | 4/2019 | Yamaguchi et al. |
| 2019/0110026 A1 | 4/2019 | Yamaguchi et al. |

FOREIGN PATENT DOCUMENTS

JP 2016-143894 A 8/2016

* cited by examiner

*Primary Examiner* — Thai Q Tran
*Assistant Examiner* — Jose M Mesa
(74) *Attorney, Agent, or Firm* — Seed IP Law Group LLP

(57) ABSTRACT

An information processing device includes a selection unit configured to select a second image related to a first image from images captured by a second camera based on a position where the first image is captured by a first camera, and a control unit configured to reproduce the first image and the second image based on respective capturing times thereof.

12 Claims, 19 Drawing Sheets

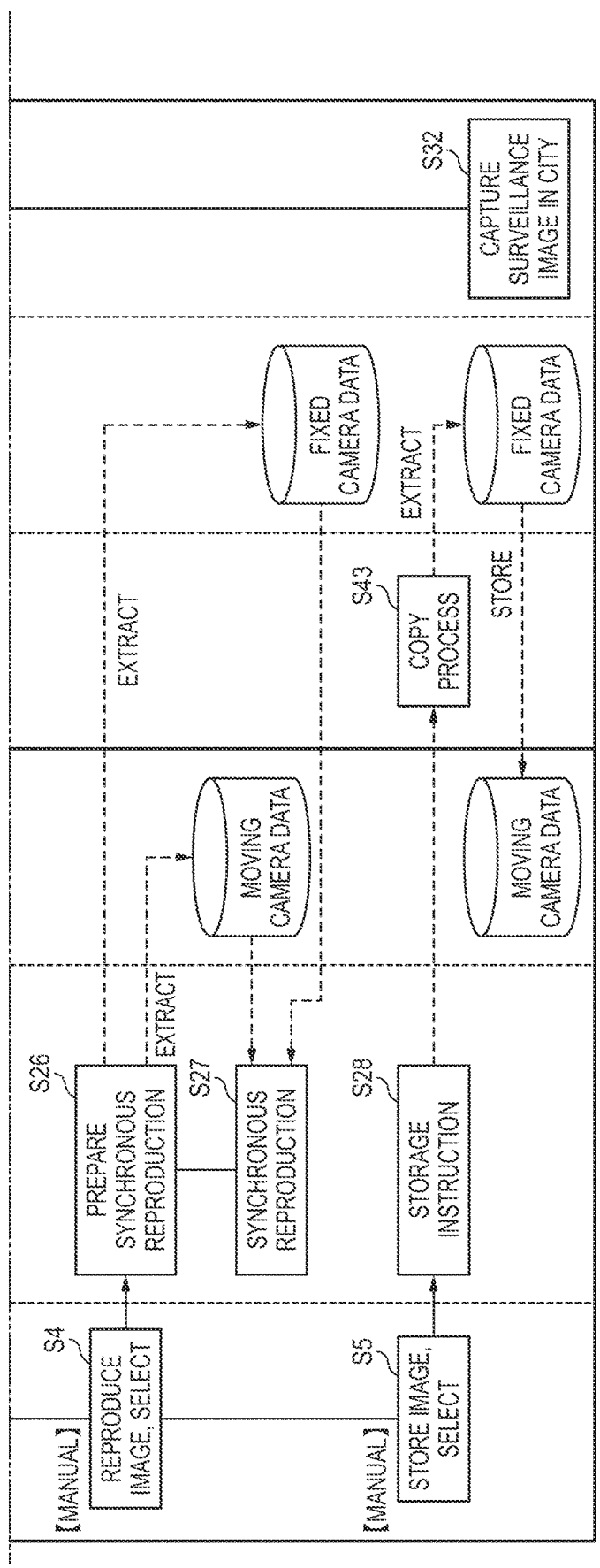
(FIG. 4 CONTINUED)

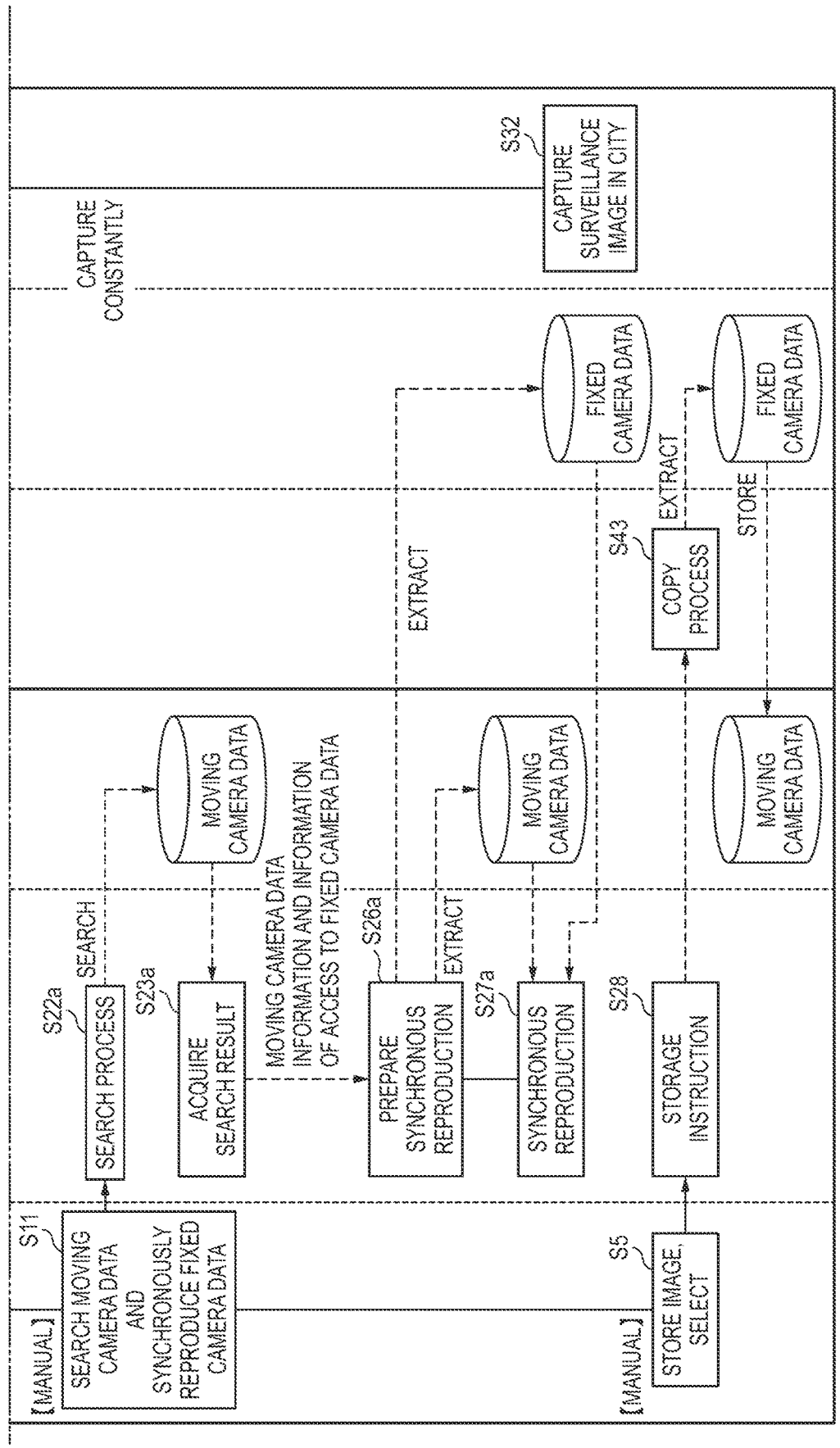

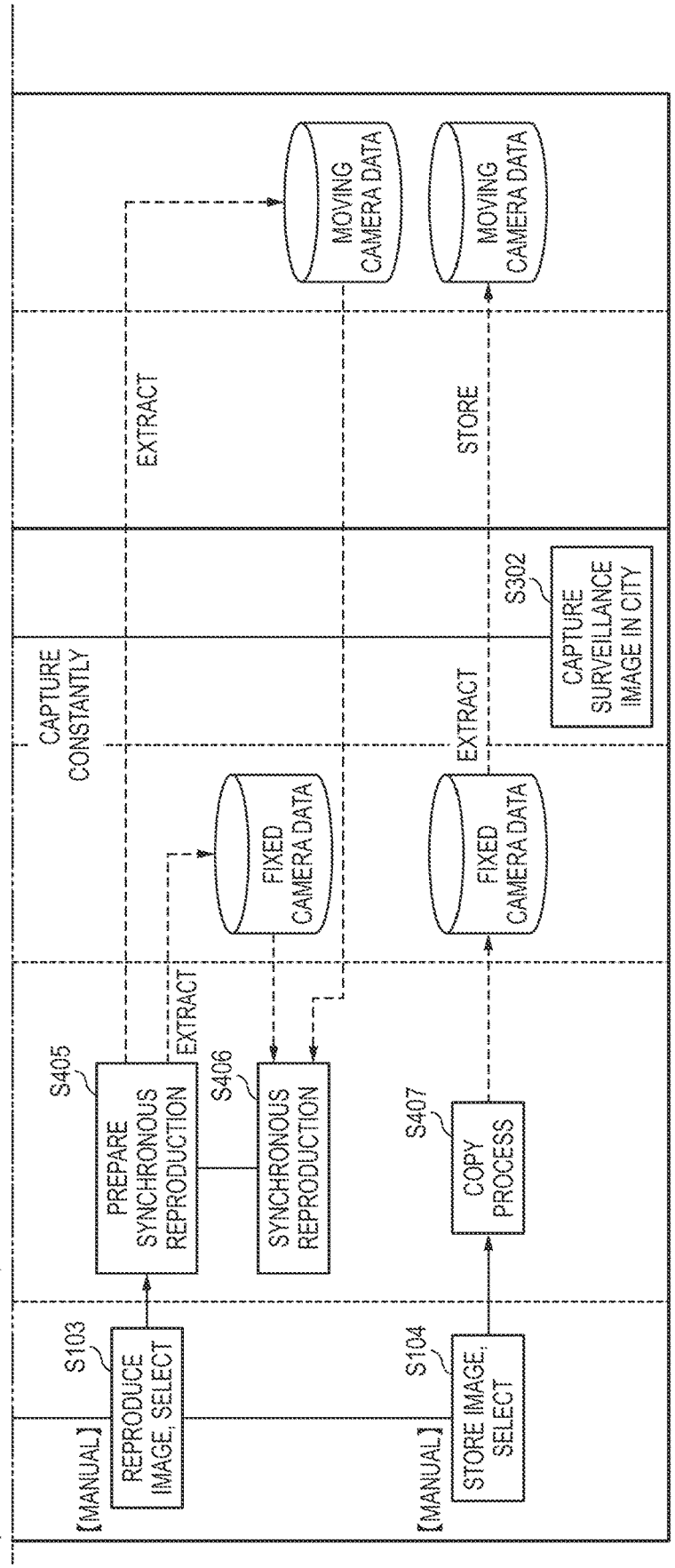

INFORMATION PROCESSING DEVICE AND REPRODUCTION CONTROL METHOD

CROSS-REFERENCE TO RELATED APPLICATIONS

This application is based on and claims priority under 35 USC 119 from Japanese Patent Application No. 2019-121135 filed on Jun. 28, 2019, the contents of which are incorporated herein by reference.

TECHNICAL FIELD

The present disclosure relates to an information processing device and a reproduction control method.

BACKGROUND ART

A system configured to manage image data captured by a camera such as a wearable camera or an in-vehicle camera (hereinafter, referred to as a "moving camera") has been proposed (for example, see Patent Literature 1).

CITATION LIST

Patent Literature

Patent Literature 1: JP-A-2016-143894

SUMMARY OF INVENTION

However, there is room for consideration on a method of improving convenience of the system configured to manage the image data.

Non-limiting examples of the present disclosure contribute to provision of an information processing device and a reproduction control method that improve the convenience of the system configured to manage the image data.

The information processing device according to one example of the present disclosure includes a selection unit configured to select a second image related to a first image from images captured by a second camera based on a position where the first image is captured by a first camera; and a control unit configured to reproduce the first image and the second image based on respective capturing times thereof.

Also, it should be noted that these comprehensive or specific aspects may be realized by a system, a device, a method, an integrated circuit, a computer program, or a recording medium, or may be realized by any combination of the system, the device, the method, the integrated circuit, the computer program, and the recording medium.

According to the one example of the present disclosure, the convenience of the system configured to manage the image data can be improved.

Further, advantages and effects of one aspect of the present disclosure will become apparent from the specification and drawings. These advantages and/or effects are provided by features described in several embodiments and the specification and drawings, and it is not necessary to provide all the embodiments and the specification and drawings to obtain one or more identical features.

DESCRIPTION OF EMBODIMENTS

Hereinafter, an embodiment of one example of the present disclosure will be described in detail with reference to the drawings as appropriate. However, unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art.

It should be noted that the accompanying drawings and the following description are provided for a thorough understanding of the present disclosure by those skilled in the art, and are not intended to limit the subject matter recited in the claims.

Configuration Example of Record Management System

Figure 1:
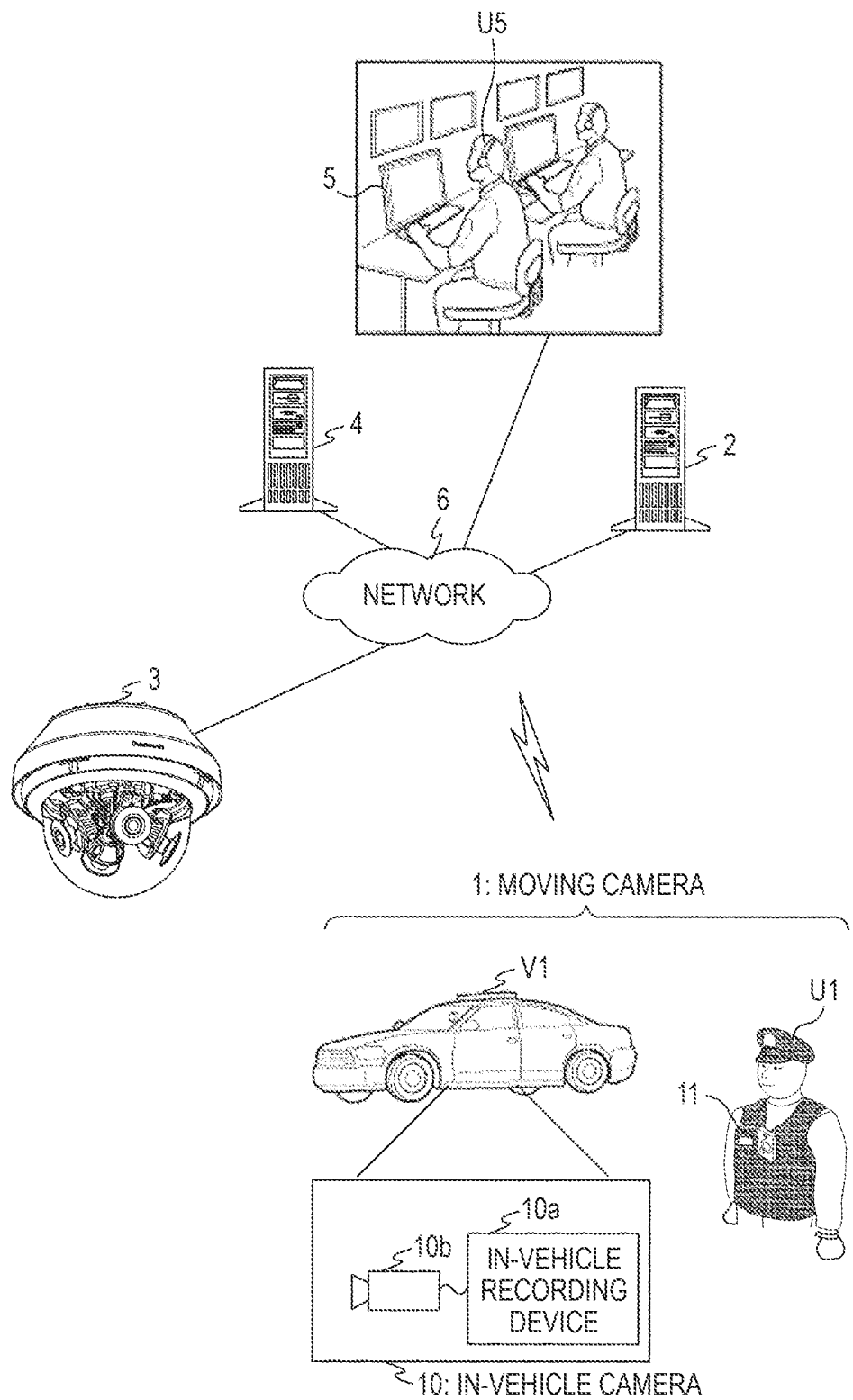
FIG. 1 shows an example of a record management system.

FIG. 1 shows an example of a system configured to manage image data (for example, referred to as a record management system) according to an example of the present disclosure. The record management system shown in FIG. 1 includes, for example, a moving camera 1, a server 2, a fixed camera 3, a server 4, and a terminal device 5. The moving camera 1 is an example of a camera that is movable (in other words, non-fixed), such as a wearable camera or an in-vehicle camera. Each of the server 2, the server 4, and the terminal device 5 is an example of an information processing device.

In the record management system, the moving camera 1, the server 2, the fixed camera 3, the server 4, and the terminal device 5 may be connected via a network 6, for example. The network 6 may be, for example, a wired network, a wireless network, or a network including wireless and wired networks. For example, the network 6 may be a wireless communication network such as a mobile phone, or may be the Internet or Ethernet (registered trademark).

For example, the record management system shown in FIG. 1 records (in other words, stores, memorizes, or saves) image data captured by the moving camera 1 (hereinafter, it may also be referred to as "moving camera data") in the server 2, and records image data captured by the fixed camera 3 (hereinafter, it may also be referred to as "fixed camera data") in the server 4. For example, the moving camera 1 and the server 2 shown in FIG. 1 constitute a system configured to manage the moving camera data captured by the moving camera 1 (hereinafter, also referred to as a "record management system of the moving camera 1"). For example, the fixed camera 3 and the server 4 constitute a system configured to manage the fixed camera data captured by the fixed camera 3 (hereinafter, also referred to as a "record management system of the fixed camera 3").

In the record management system, for example, the terminal device 5 reproduces at least one of the moving camera data recorded in the server 2 and the fixed camera data recorded in the server 4 in accordance with an operation of a user U5. Moreover, the record management system according to the one example of the present disclosure synchronously reproduces the moving camera data and the fixed camera data, for example.

For example, the record management system is a system used in a police agency or the like. For example, the moving camera 1 captures an image of a movement destination of a vehicle V1 or a user U1 (for example, a police officer). Capturing timing of the moving camera 1 may be, for example, occurrence of an event such as an incident or an accident, during a patrol, or may be timing determined by an operation of the user U1 or the user U5. The fixed camera 3 captures an image of a road or the like in a town. The user U5 (for example, the police officer) searches and reproduces image data captured by at least one of the moving camera 1 and the fixed camera 3 through using, for example, the terminal device 5 provided in a facility of the police agency (for example, a police station).

For example, the record management system of the moving camera 1 is a system configured to manage image data or the like that serves as evidence in the police agency and the like. For example, the record management system of the fixed camera 3 is a video surveillance system (for example, a video management system (VMS)). As an example, in the record management system of the moving camera 1, deletion (or erasure) of the moving camera data (for example, evidence data) stored in the server 2 may be restricted. Meanwhile, in the record management system of the fixed camera 3, the fixed camera data stored in the server 4 may be deleted (or erased) periodically, for example, after 30 days or 60 days after capturing.

It should be noted that the application described above of the record management system is an example, and the present invention is not limited thereto.

First Embodiment

In a first embodiment, for example, a case where the record management system reproduces (for example, synchronously reproduces) the moving camera data selected in the terminal device 5 by the user U5 and the fixed camera data related to the moving camera data will be described.

For example, when the user U5 selects a specific piece of the moving camera data via the terminal device 5, the terminal device 5 transmits instruction information including information related to the selected moving camera data to the server 2. Based on the instruction information, the server 2 extracts the selected moving camera data from the server 2, extracts the fixed camera data related to the selected moving camera data from the server 4, and controls synchronous reproduction of the moving camera data and the fixed camera data. Due to such control, for example, the terminal device 5 (or a display device) synchronously reproduces the moving camera data and the fixed camera data in accordance with the operation of the user U5.

Configuration Example of Moving Camera 1

In FIG. 1, the moving camera 1 is, for example, an in-vehicle camera 10 placed on the vehicle V1 (for example, a police vehicle), or a wearable camera 11 that can be worn by the user U1 (for example, the police officer). The in-vehicle camera 10 may also be referred to as an in-car video (ICV), for example. The wearable camera 11 may also be referred to as, for example, a body-worn camera (BWC). The record management system shown in FIG. 1 may include one or a plurality of the moving cameras 1, for example. The moving camera 1 is not limited to the in-vehicle camera 10 and the wearable camera 11 shown in FIG. 1, and may also be a camera placed on another moving object (for example, a flying object such as a drone).

The in-vehicle camera 10 includes, for example, an in-vehicle recording device 10a and a capturing unit 10b. The in-vehicle recording device 10a controls starting and stopping of recording of an image captured by the capturing unit 10b based on, for example, a signal output from an in-vehicle device (for example, a rotation warning light or a siren) of the vehicle V1. For example, the in-vehicle recording device 10a may start the recording of the image captured by the capturing unit 10b when the rotation warning light is turned on, and may stop the recording of the image captured by the capturing unit 10b when the rotation warning light is turned off. Alternatively, the in-vehicle recording device 10a may start and stop the recording of the image captured by the capturing unit 10b in accordance with an operation of a user (not shown), for example. Alternatively, the in-vehicle recording device 10a may start and stop the recording of the image captured by the capturing unit 10b in accordance with a start or stop instruction from the capturing unit 10b.

The in-vehicle recording device 10a communicates with the server 2, for example. The moving camera data transmitted (in other words, uploaded) from the in-vehicle camera 10 to the server 2 may include, for example, data (also referred to as metadata) such as position information indicating a position where the in-vehicle camera 10 captures the image, and time information indicating a time when the in-vehicle camera 10 captures the image, for example.

The capturing unit 10b is attached to a periphery of the vehicle V1, for example. For example, the capturing unit 10b is attached to at least one of front glass or rear glass of the vehicle V1, and captures images of at least one of a front side or a rear side of the vehicle V1. A direction where the capturing unit 10b is attached may be a right side or a left side of the vehicle V1.

In FIG. 1, the wearable camera 11 may be placed or held at a front portion of clothes of the user U1, for example, and may capture images of a front side of the user U1. The wearable camera 11 may be fixed to the front portion of the clothes, for example, in a state of being suspended with a string from a neck. The wearable camera 11 may also be fixed to the front portion of the clothes by engaging an attachment (for example, an attachment clip) attached to a rear surface of a housing of the wearable camera 11 with an attachment attached to the front portion of the clothes. For example, another camera (or also referred to as a second camera) may also be connected to the wearable camera 11. The second camera may be placed, for example, at a location different from that of the wearable camera 11, such as a shoulder or glasses of the user U1. For example, a capturing direction of the wearable camera 11 is not limited to a forward direction of the user U1, and may be any direction around the user U1 (for example, a left-right direction or a rearward direction). Alternatively, the capturing direction of the wearable camera 11 may also be a line-of-sight direction of the user U1.

The wearable camera 11 communicates with server 2, for example. Alternatively, the wearable camera 11 may communicate with the server 2 via the in-vehicle recording device 10a of vehicle V1, for example. The moving camera data transmitted (in other words, uploaded) from the wearable camera 11 to the server 2 may include, for example, metadata such as position information indicating a position where the wearable camera 11 captures the image, and time information indicating a time when the wearable camera 11 captures the image, for example.

Configuration Example of Server 2

The server 2 records, for example, the moving camera data transmitted from the moving camera 1 via the network 6. The server 2 controls synchronous reproduction of the recorded moving camera data and the fixed camera data recorded in the server 4 in accordance with, for example, the instruction information from the terminal device 5 (for example, an image data reproduction instruction). For example, the server 2 may generate screen data including both the moving camera data and the fixed camera data, and transmit the screen data to the terminal device 5 via the network 6.

Figure 2:
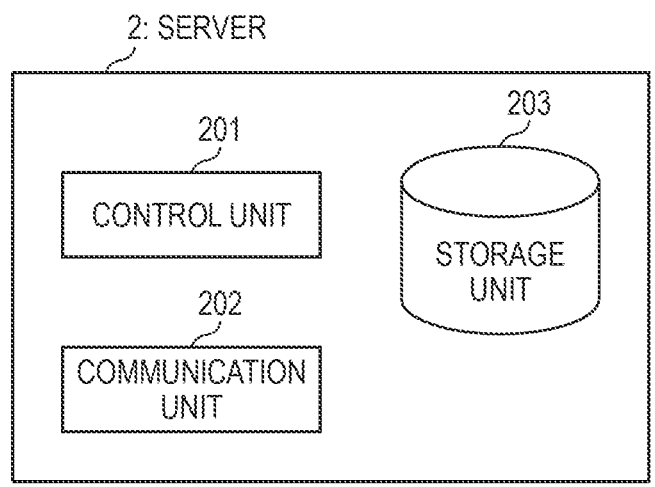
FIG. 2 shows a block configuration example of a server.

FIG. 2 shows a block configuration example of the server 2. As shown in FIG. 2, the server 2 includes a control unit 201, a communication unit 202, and a storage unit 203.

The control unit 201 controls the entire server 2. The control unit 201 may be configured by, for example, a central processing unit (CPU).

The communication unit 202 communicates with at least one of the moving camera 1, the server 4, and the terminal device 5 via the network 6, for example.

For example, a program configured to operate the control unit 201 is recorded in the storage unit 203. Data for the control unit 201 to perform calculation processing, or data for the control unit 201 to control each unit (for example, the communication unit 202 and the storage unit 203) is recorded in the storage unit 203. The moving camera data is recorded in the storage unit 203. The moving camera data, for example, may also be recorded in a device other than the server 2 (for example, storage). The storage unit 203 may be configured by a storage device such as a random access memory (RAM), a read only memory (ROM), a flash memory, or a hard disk drive (HDD).

Configuration Example of Fixed Camera 3

The fixed camera 3 is, for example, a camera (a surveillance camera etc.) provided fixedly on a traffic light, an electric pole or an outer wall of a building in a town, which captures an image of a road or the like in the town, and captures an image of a traveling vehicle or the like. The record management system may include one or a plurality of the fixed cameras 3. The fixed camera 3 may be, for example, a camera that captures images in a plurality of directions. For example, the fixed camera 3 may be a multi-camera that includes a plurality of capturing units (not shown) and captures images in a plurality of directions by the capturing units, or may be a camera that includes one capturing unit (not shown) and captures images in the plurality of directions.

The fixed camera 3 communicates with the server 4 via, for example, the network 6. The fixed camera data transmitted (in other words, uploaded) from the fixed camera 3 to the server 4 may include, for example, metadata such as position information indicating a position where the fixed camera 3 captures the image, and time information indicating a time when the fixed camera 3 captures the image. For example, the position information indicating the position of the fixed camera 3 (in other words, an installation position) may be transmitted once or a plurality of times from the fixed camera 3 to the server 4, and may be transmitted again when the installation position of the fixed camera 3 is updated. Alternatively, the position information of the fixed camera 3 may be held in advance by the server 4.

Configuration Example of Server 4

The server 4 records, for example, the fixed camera data transmitted from the fixed camera 3 via the network 6. The server 4 transmits the recorded fixed camera data to the server 2 via the network 6 in accordance with, for example, the instruction information from the server 2 (for example, a fixed camera data search instruction, a reproduction preparation instruction, or a copy instruction).

Figure 3:
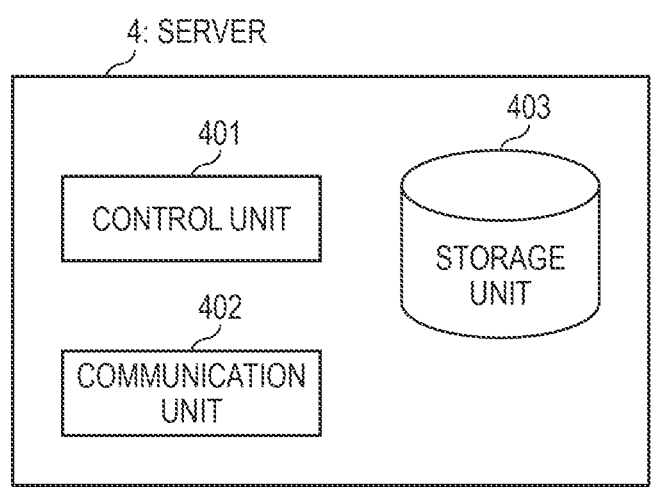
FIG. 3 shows the block configuration example of the server.

FIG. 3 shows a block configuration example of the server 4. As shown in FIG. 3, the server 4 includes a control unit 401, a communication unit 402, and a storage unit 403.

The control unit 401 controls the entire server 4. The control unit 401 may be configured by, for example, a CPU.

The communication unit 402 communicates with at least one of the server 2 or the fixed camera 3 via the network 6, for example.

A program configured to operate the control unit 401 is recorded in the storage unit 403. Data for the control unit 401 to perform calculation processing, or data for the control unit 401 to control each unit is recorded in the storage unit 403. Position information of at least one fixed camera 3 is recorded in the storage unit 403. The fixed camera data may also be recorded in a device other than the server 4 (for example, storage). The storage unit 403 may be configured by a storage device such as a RAM, a ROM, a flash memory, or an HDD.

Configuration Example of Terminal Device 5

The terminal device 5 may receive, from the user U5, an instruction related to at least one piece of image data of the moving camera data and the fixed camera data, for example, via an operation unit (not shown). In this case, the terminal device 5 transmits instruction information including the instruction related to the image data to the server 2.

The terminal device 5 receives screen data including the image data from the server 2, for example. The terminal device 5 displays the received screen data on a display unit (for example, a display which is not shown).

The terminal device 5 may be, for example, a personal computer (PC), a tablet terminal, or a smartphone.

The record management system may include one or a plurality of the terminal devices 5.

Operation Example of Record Management System

Next, an operation example of the record management system shown in FIG. 1 will be described.

Hereinafter, an example of methods for searching the fixed camera data related to the moving camera data to be displayed (Method 1 and Method 2) will be described. Method 1 is a method in which the user U5 that operates the terminal device 5 manually performs a process of searching (or a process of selecting) the fixed camera data related to the moving camera data to be displayed. Method 2 is a method in which the record management system (for example, the server 2) automatically performs the process of searching the fixed camera data related to the moving camera data to be displayed.

[Method 1]

Figure 4:
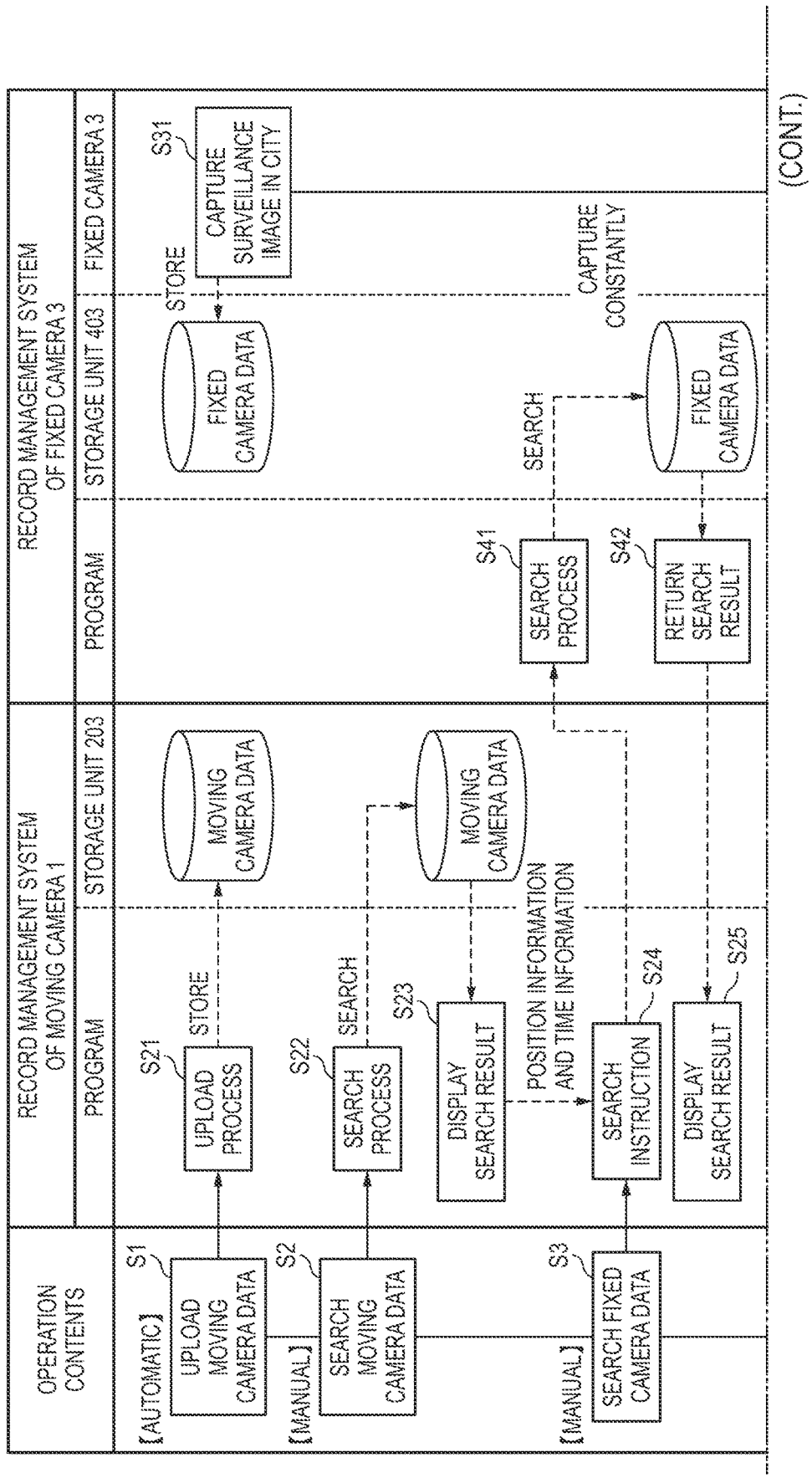
FIG. 4 shows an operation example of the record management system according to Method 1 of a first embodiment.

FIG. 4 shows an operation example of the record management system according to Method 1.

<Upload of Fixed Camera Data>

In FIG. 4, one or a plurality of the fixed cameras 3 are provided, for example, in a town. For example, the fixed camera 3 generates the fixed camera data, which is image data of an image (for example, surveillance image in a city) captured constantly (or periodically or aperiodically) (S31 and S32), and transmits (in other words, uploads) the fixed camera data to the server 4. The server 4 stores the fixed camera data in the storage unit 403. The fixed camera data stored in the server 4 may also include, for example, the position information indicating the position (for example, the installation position) where the fixed camera 3 captures the image, and the time information indicating the time when the fixed camera 3 captures the image (for example, date and time), in addition to the image data.

<Upload of Moving Camera Data>

Image data (for example, moving camera data) captured by the moving camera 1 (for example, the in-vehicle camera 10 or the wearable camera 11) is automatically transmitted (in other words, uploaded) to the server 2 (S1). Automatic upload of the moving camera data may be performed, for example, when the moving camera data is generated, or may be performed when the moving camera 1 is located in a specific area (for example, the police station). The upload of the moving camera data is not limited to be automatically performed, and may also be manually performed by an operation of a user (for example, the user U1).

When the moving camera data is uploaded, the moving camera 1 and the server 2 perform an upload process (S21). For example, the server 2 stores the moving camera data uploaded from the moving camera 1 in the storage unit 203. The moving camera data stored in the server 2 may also include, for example, the position information indicating the position where the moving camera 1 captures the image, and the time information indicating the time (for example, date and time) when the moving camera 1 captures the image, in addition to the image data.

<Search of Moving Camera Data>

In FIG. 4, when the user U5 operates the terminal device 5 to give an instruction to search for the moving camera data (S2), the terminal device 5 and the server 2 perform a moving camera data search process (S22). For example, the terminal device 5 transmits information, which is input by the user U5 and related to the search process, (for example, a search instruction or a search condition) to the server 2. For example, the server 2 extracts the moving camera data satisfying the search condition from the moving camera data recorded in the storage unit 203.

Then, for example, the server 2 generates screen data including information related to the extracted moving camera data (in other words, a search result), and transmits the screen data to the terminal device 5. The terminal device 5 displays the screen data received from the server 2 (S23).

The search result of the moving camera data may include, for example, information for identifying the extracted moving camera data and metadata related to the moving camera data (for example, the position information and the time information). The information for identifying the moving camera data may be, for example, index information indicating an index of the moving camera data, or may be access information related to access to a storage location of the moving camera data. In other words, the search result of the moving camera data may at least include information related to the storage location of the searched moving camera data, and may not include the image data. Moreover, the server 2 may generate a thumbnail of the searched moving camera data, and may include the thumbnail in the screen data related to the search result.

Figure 5:
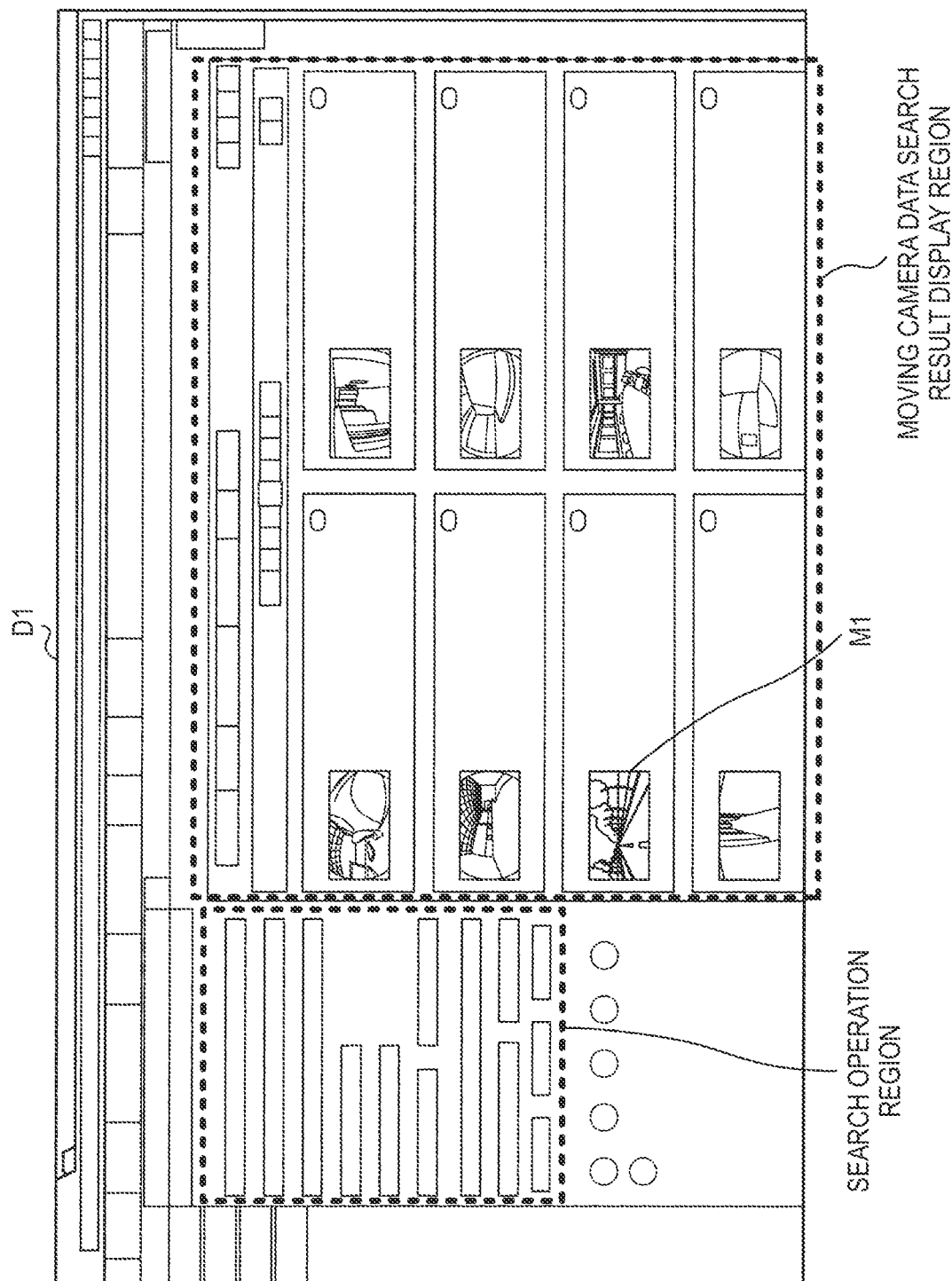
FIG. 5 shows an example of a search screen of moving camera data.

FIG. 5 shows an example of a screen related to the moving camera data search process displayed on the terminal device 5.

A display screen D1 shown in FIG. 5 includes, for example, a "search operation region" in which the user U5 performs a search operation, and a "search result display region" that displays the search result of the moving camera data.

For example, an input field or a button configured to input a search character string for specifying the moving camera data to be searched by the user U5 may be arranged in the search operation region shown in FIG. 5. For example, a "search start button" configured to instruct the record management system (for example, the record management system of the moving camera 1) to search for the moving camera data may be arranged in the search operation region. For example, the user U5 may input (or select) the search character string corresponding to the moving camera data to be searched by the user U5, and press the search start button. The terminal device 5 transmits instruction information including a search instruction corresponding to the search character string to the server 2.

The search character string includes, for example, an "incident number" that is an identification number for identifying an incident (in other words, an event), a "camera name" (or "camera number") for identifying the moving camera 1, "user name" and "vehicle name" (or user number and vehicle number) for identifying the user U1 (for example, a police officer or officer) or the vehicle V1 (for example, a police vehicle), and a "file name" of the moving camera data or "upload time" (or "capturing time") indicating a time when the moving camera data is uploaded to the server 2. It should be noted that the search character string is not limited to such information, and may also be any information capable of specifying the moving camera data.

For example, the search result of the moving camera data corresponding to the search character string (in other words, the search condition) input in the search operation region is displayed in the search result display region shown in FIG. 5. For example, the search results of the moving camera data may be displayed in a list. For example, the searched moving camera data may be tiled for each incident as shown in FIG. 5 or may be displayed in a list (not shown). It should be noted that a display mode of the search results is not limited to the tile display and the list display.

In FIG. 5, for example, the user U5 may select one or a plurality of pieces of the moving camera data from the list of the moving camera data shown in the search result display region. The terminal device 5 may display, for example, a screen showing details of the moving camera data selected in the search result display region.

Figure 6:
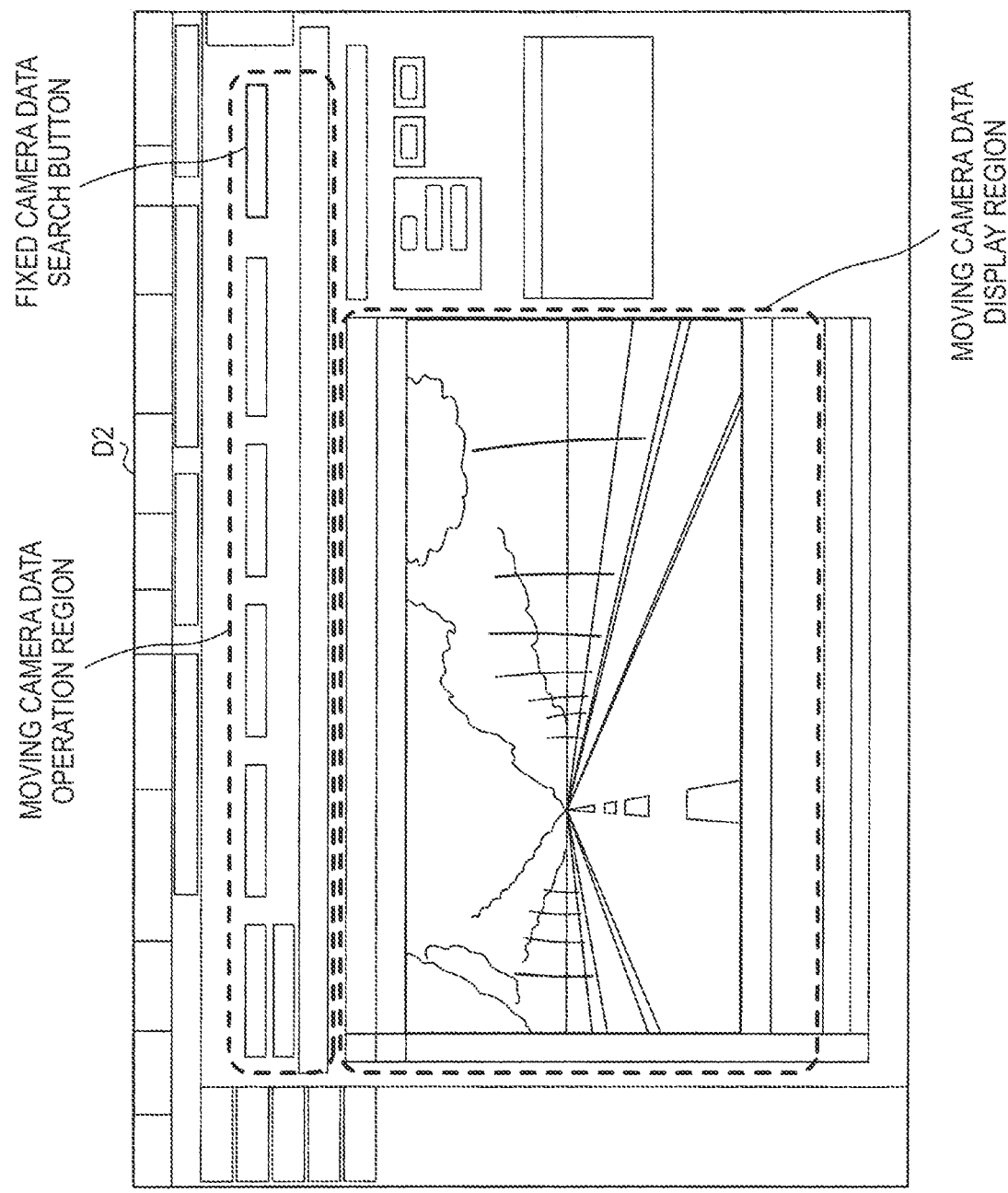
FIG. 6 shows an example of a screen displaying a search result of the moving camera data.

FIG. 6 shows an example of a screen displayed on the terminal device 5 when one piece of the moving camera data "M1" is selected from the moving camera data displayed in the search result display region of FIG. 5. It should be noted that the number of pieces of the moving camera data selected in the search result display region is not limited to one, and may also be plural.

A display screen D2 shown in FIG. 6 includes, for example, a "moving camera data display region" for displaying the selected moving camera data (for example, the moving camera data M1), and a "moving camera data operation region" in which buttons and the like used for operations related to the selected moving camera data are arranged. In Method 1, as shown in FIG. 6, the moving camera data operation region may at least include a "fixed camera data search" button for searching the fixed camera data related to the selected moving camera data.

<Search of Fixed Camera Data>

In FIG. 4, for example, when the user U5 operates the terminal device 5 (for example, presses the fixed camera data search button of FIG. 6) to give an instruction to search for the fixed camera data (S3), the terminal device 5 and the server 2 instruct the server 4 to search for the fixed camera data (S24). For example, the terminal device 5 transmits information including a search instruction of the fixed camera data related to the selected moving camera data to the server 2, and the server 2 transmits the information including the search instruction of the fixed camera data to the server 4. At this time, the search instruction information transmitted from the server 2 to the server 4 includes, for example, the position information and the time information related to the selected moving camera data.

Upon receiving the search instruction information of the fixed camera data from the server 2, the server 4 performs a fixed camera data search process (S41). For example, the server 4 extracts the fixed camera data related to the moving camera data from the fixed camera data recorded in the storage unit 403 based on the position information and the time information indicated in the search instruction information.

For example, the server 4 may extract (in other words, select) the fixed camera data of the fixed camera 3 provided in an area corresponding to a position of the moving camera 1 indicated in the position information (in other words, a position where the moving camera data is captured) among a plurality of pieces of the fixed camera data (in other words, images captured by the fixed camera 3). The fixed camera data related to the moving camera data may be, for example, the fixed camera data captured by the fixed camera 3 located at a distance within a threshold from a capturing position of the moving camera data. The threshold may be a fixed value or a variable value.

In other words, the fixed camera data related to the moving camera data may be fixed camera data captured by the fixed camera 3 located at a distance within a threshold from each of a plurality of capturing positions (or a line segment connecting the plurality of positions) on a movement path (in other words, a movement trajectory) of the moving camera 1 corresponding to the moving camera data to be searched by the user U5.

For example, the server 4 may extract (in other words, select) the fixed camera data captured at a time corresponding to the time when the moving camera data is captured indicated in the time information among a plurality of pieces of the fixed camera data. The fixed camera data related to the moving camera data may also be fixed camera data captured by the fixed camera 3 during, for example, a capturing time period of the moving camera data (for example, a time period from a capturing start time to a capturing end time).

In this way, the server 4 may extract the fixed camera data captured at the same position and the same time as the moving camera data among the fixed camera data stored in the storage unit 403 based on the position information and the time information related to the moving camera data.

The server 4 transmits information indicating a search result of the fixed camera data to the server 2 (S42). Based on the information indicating the search result of the fixed camera data transmitted from the server 4, the server 2 generates screen data including the search result of the fixed camera data and transmits the screen data to the terminal device 5. The terminal device 5 displays the screen data received from the server 2 (S25).

The search result of the fixed camera data may include, for example, information for identifying the extracted fixed camera data (for example, index information or access information), and metadata related to the fixed camera data (for example, the position information and the time information). In other words, the search result of the fixed camera data may at least include information related to a storage location of the searched fixed camera data, and may not include the image data. Moreover, the server 2 may generate a thumbnail of the searched fixed camera data, and may include the thumbnail in the screen data related to the search result. It should be noted that the thumbnail may also be generated in the server 4.

Figure 7:
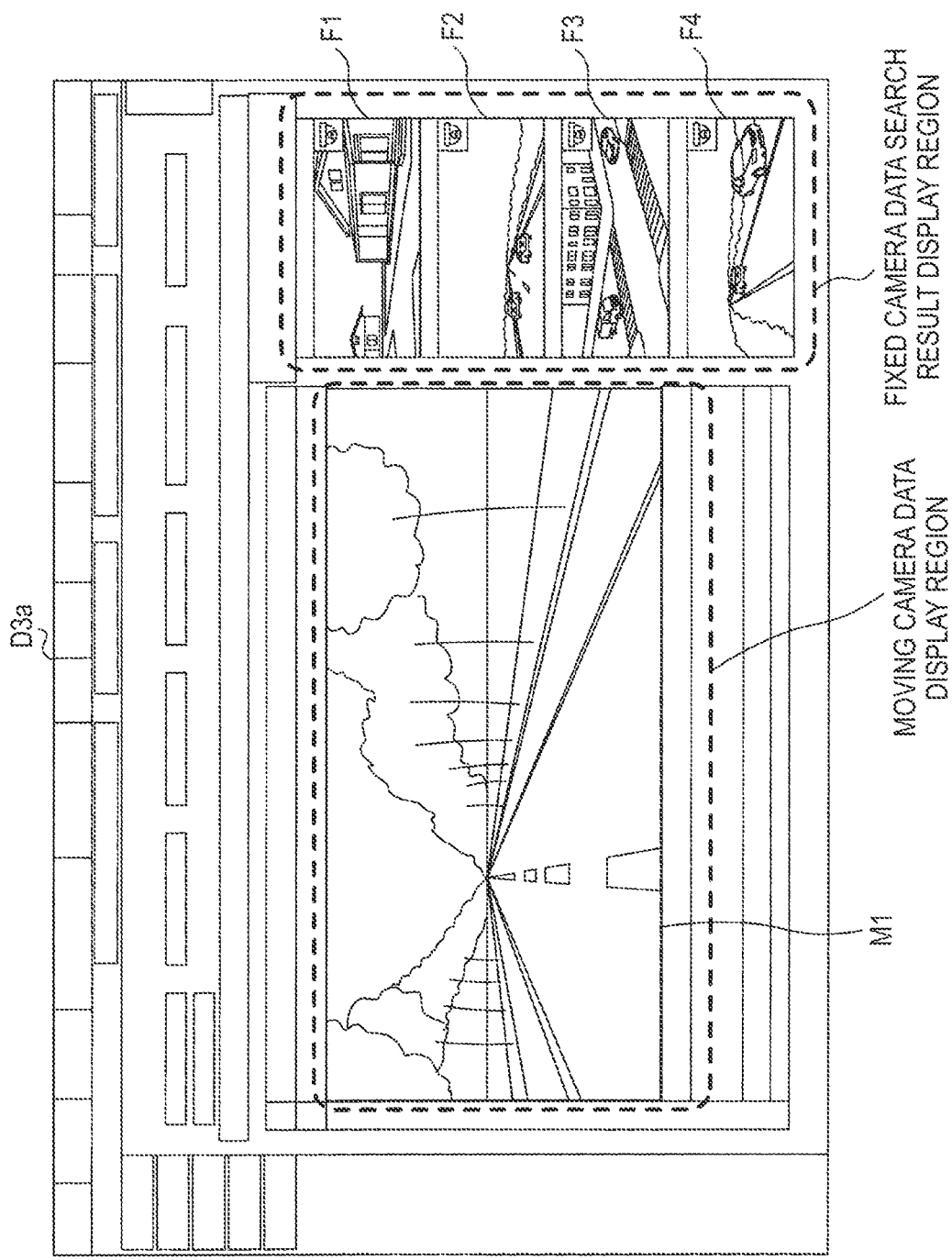
FIG. 7 shows an example of a screen displaying a search result of fixed camera data.
Figure 8:
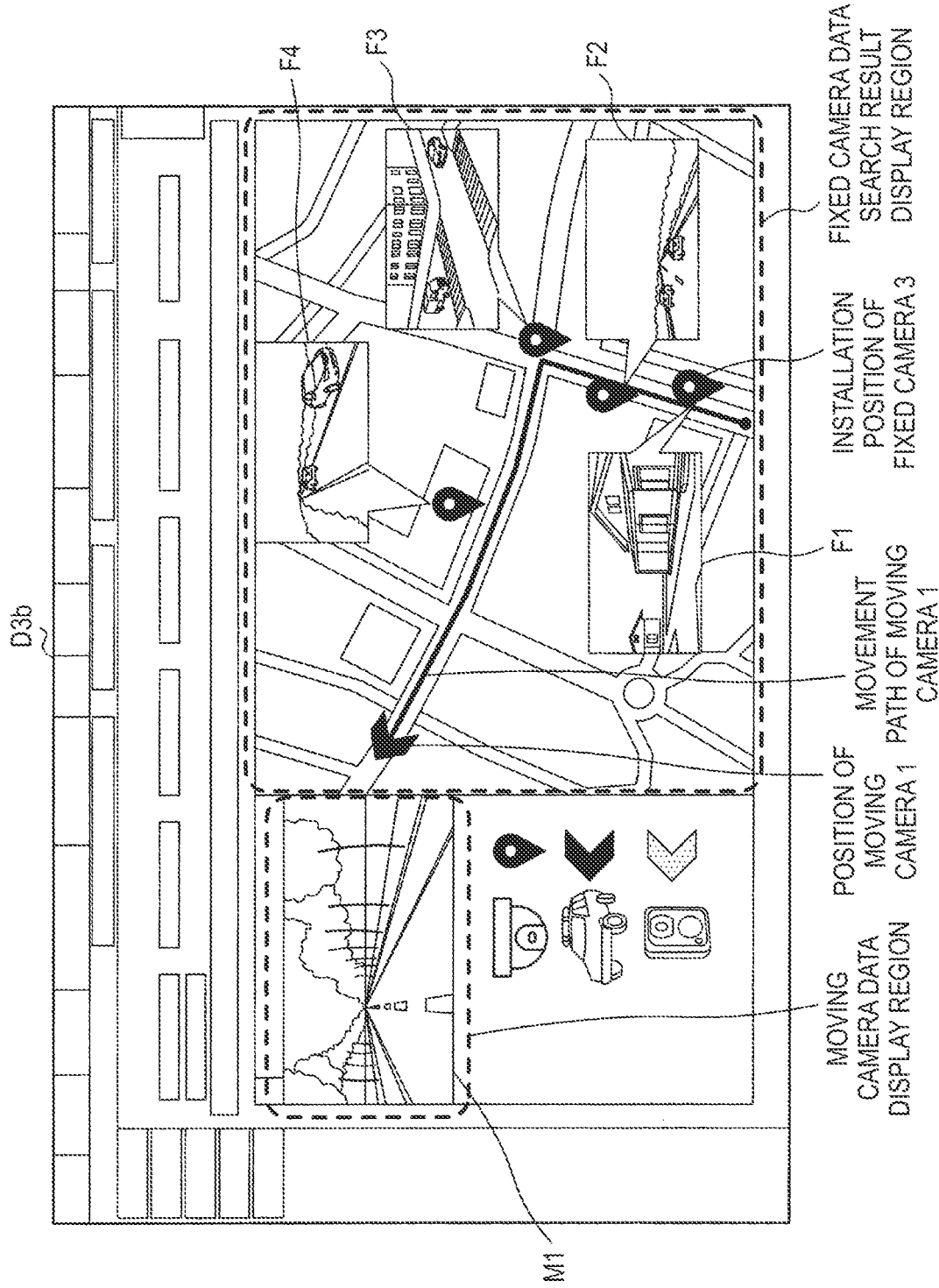
FIG. 8 shows the example of the screen displaying the search result of the fixed camera data.

FIGS. 7 and 8 show an example of a screen related to the search result of the fixed camera data displayed on the terminal device 5.

Display screens D3a and D3b shown in FIGS. 7 and 8 include, for example, a "moving camera data display region" for displaying the moving camera data, and a "fixed camera data search result display region" for displaying the search result of the fixed camera data. In FIGS. 7 and 8, as an example of the search result, four pieces of fixed camera data F1, F2, F3, and F4 (for example, thumbnails) related to the moving camera data M1 displayed in the moving camera data display region are displayed.

In the fixed camera data search result display region of the display screen D3a shown in FIG. 7, a plurality of (for example, four) pieces of fixed camera data F1, F2, F3, and F4 related to the moving camera data M1 are displayed in a list. The plurality of pieces of fixed camera data F1, F2, F3, and F4 may be, for example, image data captured by different fixed cameras 3, or may include a plurality of pieces of image data captured by the same fixed camera 3 (for example, image data in different capturing directions).

In the fixed camera data search result display region of the display screen D3b shown in FIG. 8, the position of the moving camera 1, the movement path of the moving camera 1, installation positions of a plurality of fixed cameras 3, and the fixed camera data F1, F2, F3, and F4 corresponding to each fixed camera 3 are displayed on a map including the movement path of the moving camera 1. For example, in the moving camera data display region of the display screen D3b shown in FIG. 8, the moving camera data M1 corresponding to the position of the moving camera 1 on the map may be displayed.

<Reproduction of Image Data>

In FIG. 4, for example, when the user U5 selects the fixed camera data to be reproduced from the search result of the fixed camera data (S4), the terminal device 5 and the server 2 perform a preparation process of synchronous reproduction of the moving camera data and the fixed camera data (S26). For example, the terminal device 5 transmits information related to the moving camera data and information related to the fixed camera data selected by the user U5 to the server 2. For example, the server 2 extracts the corresponding moving camera data (in other words, image data) from the storage unit 203 based on the information transmitted from the terminal device 5. The server 2 instructs the server 4 (for example, the storage unit 403) to extract the corresponding fixed camera data (in other words, image data), and receives the fixed camera data from the server 4. Then the server 2 generates screen data including a reproduction screen of the extracted moving camera data and the fixed camera data, and transmits the screen data to the terminal device 5. The terminal device 5 synchronously reproduces the moving camera data and the fixed camera data based on the screen data received from the server 2 (S27).

For example, each piece of the fixed camera data may be reproduced in synchronization with the capturing time of the moving camera data. By such synchronous reproduction, the user U5 that operates the terminal device 5 can confirm both the moving camera data captured by the moving camera 1 and the fixed camera data of the fixed camera 3 provided around the movement path of the moving camera 1 at the time of capturing the moving camera data.

Alternatively, the fixed camera data captured by each fixed camera 3 may be reproduced in synchronization with the capturing time of the moving camera data in accordance with positions of a plurality of the fixed cameras 3. For example, the fixed camera data reproduced in synchronization with the moving camera data may be the fixed camera data captured by the fixed camera 3 located at a distance within a threshold from the position of the moving camera 1 corresponding to the moving camera data. In other words, the fixed camera data of the plurality of fixed cameras 3 provided around the movement path of the moving camera 1 may be sequentially switched and reproduced in accordance with movement of the moving camera 1. By such reproduction, the user U5 that operates the terminal device 5 can confirm, for example, image data from a plurality of viewpoints of the moving camera 1 and the fixed cameras 3 at a capturing location of the moving camera 1. In this case, the fixed camera data corresponding to the fixed camera 3 at a position away from the moving camera 1 (for example, in an area whose distance from the position of the moving camera 1 is greater than the threshold) may not be reproduced. Therefore, for example, an amount of processing of the terminal device 5 can be reduced.

<Copy of Fixed Camera Data>

In FIG. 4, for example, the user U5 selects data to be stored in association with the moving camera data (hereinafter, may also be referred to as stored image data) among the searched fixed camera data (S5). For example, the stored image data may be selected by the user U5 from the search result of the fixed camera data in an operation of S5 shown in FIG. 4. Alternatively, the stored image data may also be, for example, fixed camera data selected by a reproduced image selection operation of S4 shown in FIG. 4.

The terminal device 5 and the server 2 instruct the server 4 to store the selected stored image data (S28). For example, the terminal device 5 transmits information related to the selected stored image data to the server 2, and the server 2 instructs the server 4 to store the fixed camera data in the server 2 (for example, the storage unit 203) based on the information related to the stored image data transmitted from the terminal device 5.

The server 4 performs a process of copying the fixed camera data to the server 2 (in other words, the record management system of the moving camera 1) based on a storage instruction from the server 2 (S43). For example, the server 4 extracts the fixed camera data instructed by the server 2 from the storage unit 403, and transmits the extracted fixed camera data to the server 2. The fixed camera data transmitted to the server 2 is stored in the storage unit 203, for example.

With such a copy process, the fixed camera data related to the moving camera data is copied from the storage device in the record management system of the fixed camera 3 (for example, the storage unit 403 of the server 4) to the storage device in the record management system of the moving camera 1 (for example, the storage unit 203 of the server 2). A copy destination of the fixed camera data is not limited to the server 2, and may also be, for example, another storage device in the record management system of the moving camera 1.

For example, in the record management system of the fixed camera 3, the fixed camera data can be assumed to be deleted (in other words, erased) in the server 4 after a certain period (for example, 30 days or 60 days) has elapsed. Even in this case, due to the above-described copy process (for example, the processes of S5, S28, and S43 shown in FIG. 4), the fixed camera data related to the moving camera data is stored in the server 2 in which data deletion (or erasure) is restricted. For example, the record management system of the moving camera 1 can reliably leave the fixed camera data related to the moving camera data as evidence related to an incident. Therefore, for example, even after the corresponding fixed camera data is deleted in the record management system of the fixed camera 3, the user U5 can reproduce the fixed camera data stored in the record management system of the moving camera 1.

Figure 9:
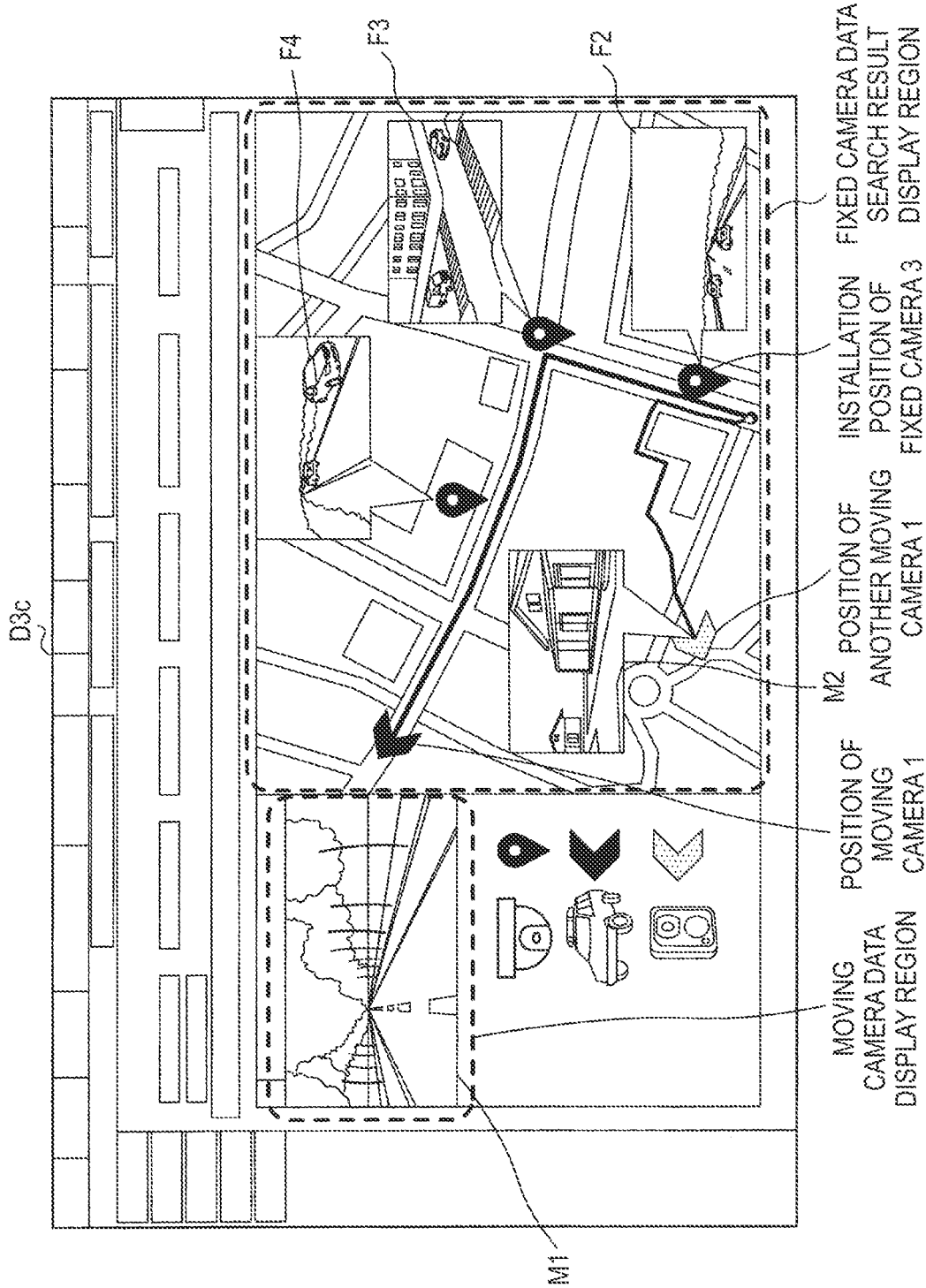
FIG. 9 shows the example of the screen displaying the search result of the fixed camera data.

In FIGS. 7 and 8, a case where the fixed camera data related to the moving camera data M1 is searched and displayed has been described. However, the image data related to the moving camera data M1 is not limited to the fixed camera data, and may also be, for example, moving camera data M2 of another moving camera 1 (the wearable camera 11 in FIG. 9) such as the in-vehicle camera 10 or the wearable camera 11 as in a display screen D3c shown in FIG. 9. In other words, the image data related to the moving camera data M1 is acceptable as long as the image data is captured in the area corresponding to the position (or movement path) of the moving camera 1.

Figure 10:
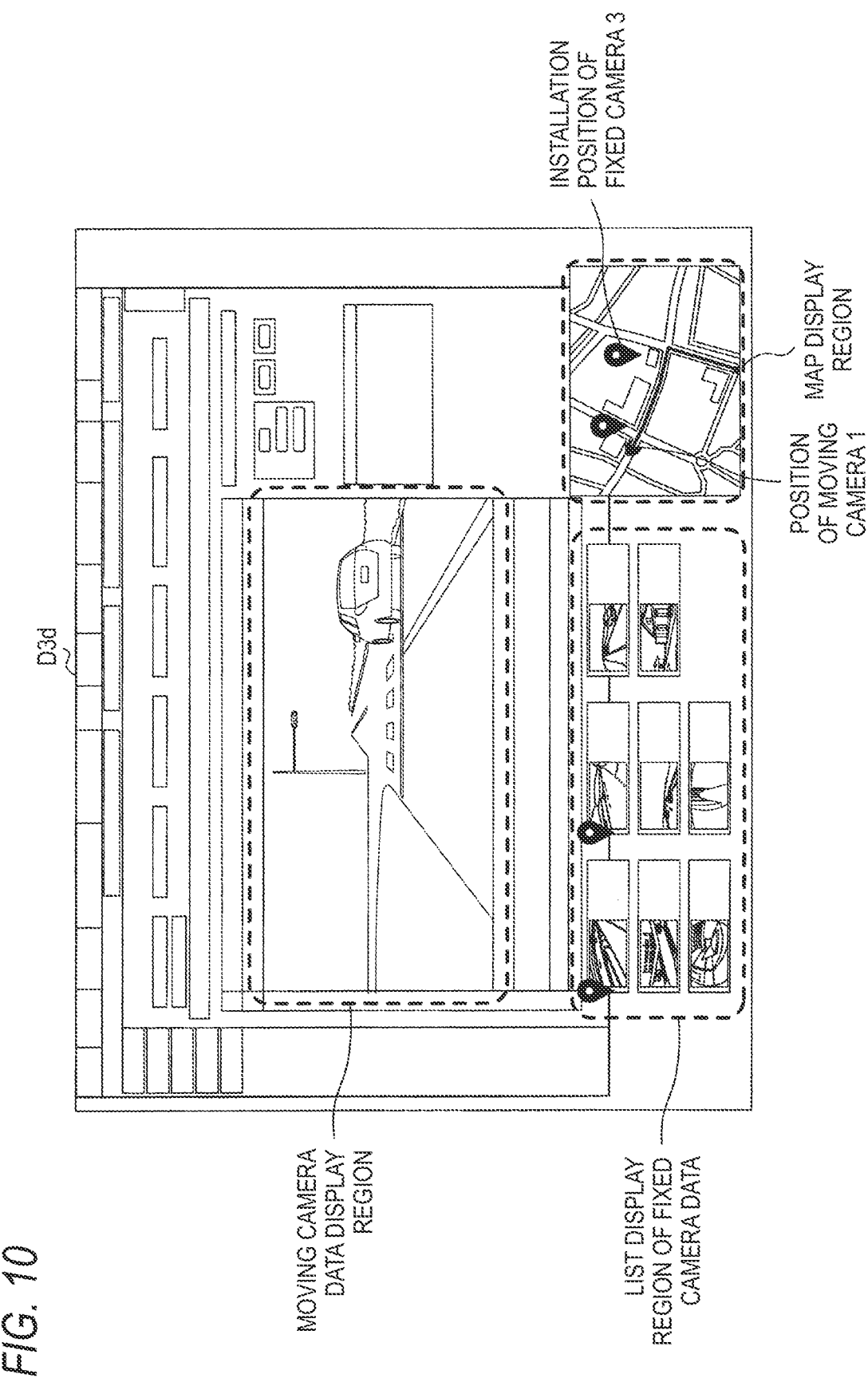
FIG. 10 shows the example of the screen displaying the search result of the fixed camera data.

The reproduction screen of the moving camera data and the fixed camera data may include, for example, a moving camera data display region, a fixed camera data list display region, and a map display region indicating the positions of the moving camera 1 and the fixed camera 3, as shown in a display screen D3d shown in FIG. 10. According to such a display mode, it is easier for the user U5 to visually specify a positional relationship between the moving camera 1 and the fixed camera 3 corresponding to the moving camera data and the fixed camera data displayed on the terminal device 5. Moreover, as shown in FIG. 10, the fixed camera data to be reproduced may also be sequentially switched in accordance with the movement of the moving camera 1 (for example, the vehicle V1 or the user U1), for example.

FIG. 4 shows a case where the user U5 individually selects the fixed camera data to be reproduced from the search result of the fixed camera data. However, a method of selecting the fixed camera data to be reproduced is not limited thereto.

For example, the user U5 may select a period to be reproduced (for example, a reproduction start time and a reproduction end time). For example, the terminal device 5 and the server 2 may select fixed camera data captured within the reproduction period selected by the user U5, and synchronously reproduce the selected fixed camera data and moving camera data.

Alternatively, the user U5 may select a position (area) to be reproduced, for example. For example, the terminal device 5 and the server 2 may reproduce the fixed camera data of the fixed camera 3 located in the area selected by the user U5 in synchronization with the moving camera data.

[Method 2]

Figure 11:
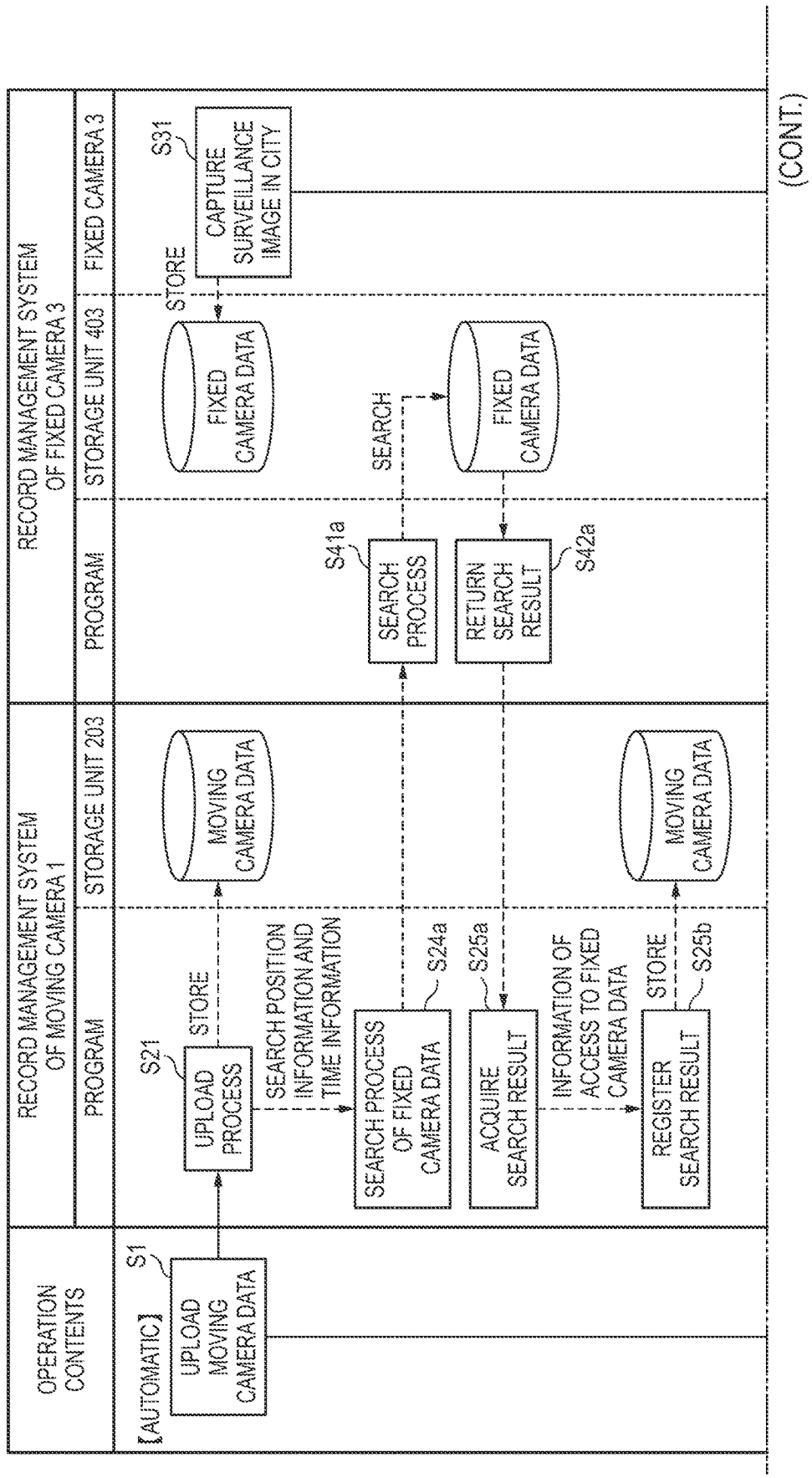
FIG. 11 shows an operation example of a record management system according to Method 2 of the first embodiment.

FIG. 11 shows an operation example of the record management system according to Method 2. In FIG. 11, the same operations as those in FIG. 4 (Method 1) are denoted by the same reference numerals, and descriptions thereof are omitted.

<Search of Fixed Camera Data>

When the moving camera data is uploaded from the moving camera 1 (S21), the server 2 performs a search process of the fixed camera data based on the metadata (for example, the position information and the time information) of the uploaded moving camera data (S24a). For example, the server 2 instructs the server 4 to search for the fixed camera data. At this time, the search instruction information transmitted from the server 2 to the server 4 includes, for example, the position information and the time information related to the uploaded moving camera data which is to be searched.

It should be noted that timing of starting the search process of the fixed camera data may be, for example, timing when the upload is performed, or may be timing different from the timing when the upload is performed. For example, the server 2 may start the search process of the fixed camera data when a server load on at least one of the server 2 and the server 4 is low (for example, when the amount of processing is less than a threshold) or during a time period when the server load is assumed to be low (for example, nighttime).

Upon receiving the search instruction information of the fixed camera data from the server 2, the server 4 performs the fixed camera data search process (S41a). For example, the server 4 may extract the fixed camera data from the fixed camera data recorded in the storage unit 403 based on the position information and the time information related to the moving camera data.

The server 4 transmits information indicating the search result of the fixed camera data to the server 2 (S42a), and the server 2 acquires (in other words, receives) the information indicating the search result of the fixed camera data (S25a). The server 2 stores (in other words, registers) the information indicating the search result of the fixed camera data in the storage unit 203 (S25b).

The search result of the fixed camera data may include, for example, information for identifying the extracted fixed camera data (for example, index information or access information), and metadata related to the fixed camera data (for example, the position information and the time information). In other words, the search result of the fixed camera data may at least include information related to a storage location of the searched fixed camera data, and may not include the image data. Moreover, the server 2 may generate a thumbnail of the searched fixed camera data, and may include the thumbnail in the screen data related to the search result.

As described above, in Method 2, when the moving camera data is uploaded, the record management system automatically searches the fixed camera data related to the moving camera data.

<Search of Moving Camera Data and Reproduction of Image Data>

In FIG. 11, when the user U5, for example, operates the terminal device 5 to give an instruction to search for the moving camera data and to perform synchronous reproduction of the moving camera data and the fixed camera data (S11), the terminal device 5 and the server 2 perform the moving camera data search process (S22a). For example, similarly to Method 1 (see, for example, FIG. 5), the terminal device 5 transmits the information related to the search process (for example, the search instruction or the search condition) input by the user U5 to the server 2. For example, the server 2 extracts moving camera data satisfying the search condition from the moving camera data recorded in the storage unit 203, and acquires the information related to the extracted moving camera data (in other words, the search result) (S23a). The search result of the moving camera data may include, for example, information related to the storage location of the extracted moving camera data (for example, the access information), and information related to the storage location of the fixed camera data related to the moving camera data (for example, the access information).

After the search of the moving camera data, the server 2 performs, for example, the preparation process of synchronous reproduction of the moving camera data and the fixed camera data (S26a). For example, the server 2 extracts the moving camera data (in other words, image data) from the storage unit 203 based on the access information of the moving camera data. Based on the access information of the fixed camera data, the server 2 instructs the server 4 (storage unit 403) to extract the corresponding fixed camera data (in other words, image data), and receives the fixed camera data from the server 4.

Then the server 2 generates screen data including a reproduction screen of the extracted moving camera data and fixed camera data, and transmits the screen data to the terminal device 5. The terminal device 5 synchronously reproduces the moving camera data and the fixed camera data based on the screen data received from the server 2 (S27a). The method of reproducing the moving camera data and the fixed camera data may be the same as, for example, Method 1 (for example, FIG. 7, 8, 9, or 10).

In this way, in Method 2, there is a high possibility that the search process of the fixed camera data related to the moving camera data to be searched by the user U5 is completed when the moving camera data is searched by the user U5, for example. Therefore, when the user U5 searches for the moving camera data, the record management system can perform a synchronous reproduction process without performing the search process of the fixed camera data related to the moving camera data.

Method 1 and Method 2 have been described above.

In the record management system according to the first embodiment, the server 2 selects an image related to an image of the moving camera 1 from images captured by the fixed camera 3 based on the position where the moving camera 1 captures the image and the time when the moving camera 1 captures the image. Then the server 2 reproduces (for example, synchronously reproduces) the image of the moving camera 1 and the image of the fixed camera 3 based on respective capturing times thereof.

Therefore, by selecting the moving camera data, the user U5 can confirm the fixed camera data related to the moving camera data in addition to the selected moving camera data, for example. In other words, in the record management system, since the user U5 does not need to separately search for the moving camera data and the fixed camera data, convenience of the record management system can be improved.

In the present embodiment, the server 2 copies the fixed camera data related to the moving camera data into the record management system of the moving camera 1 (for example, the server 2). In the record management system of the fixed camera 3, for example, even after the fixed camera data is deleted after a certain period of time has elapsed since the fixed camera data is captured, the user U5 can confirm the fixed camera data related to the moving camera data due to such a copy process, so that the convenience of the record management system can be improved.

Second Embodiment

In the first embodiment, for example, a case where the record management system searches for the fixed camera data related to the moving camera data and synchronously reproduces the moving camera data and the fixed camera data has been described. In contrast, in a second embodiment, for example, a case where the record management system searches for the moving camera data related to the fixed camera data and synchronously reproduce the fixed camera data and the moving camera data will be described.

Since a configuration of the record management system according to the second embodiment may be the same as the configuration of the record management system according to the first embodiment, a description thereof will be made with reference the record management system shown in FIG. 1.

Figure 12:
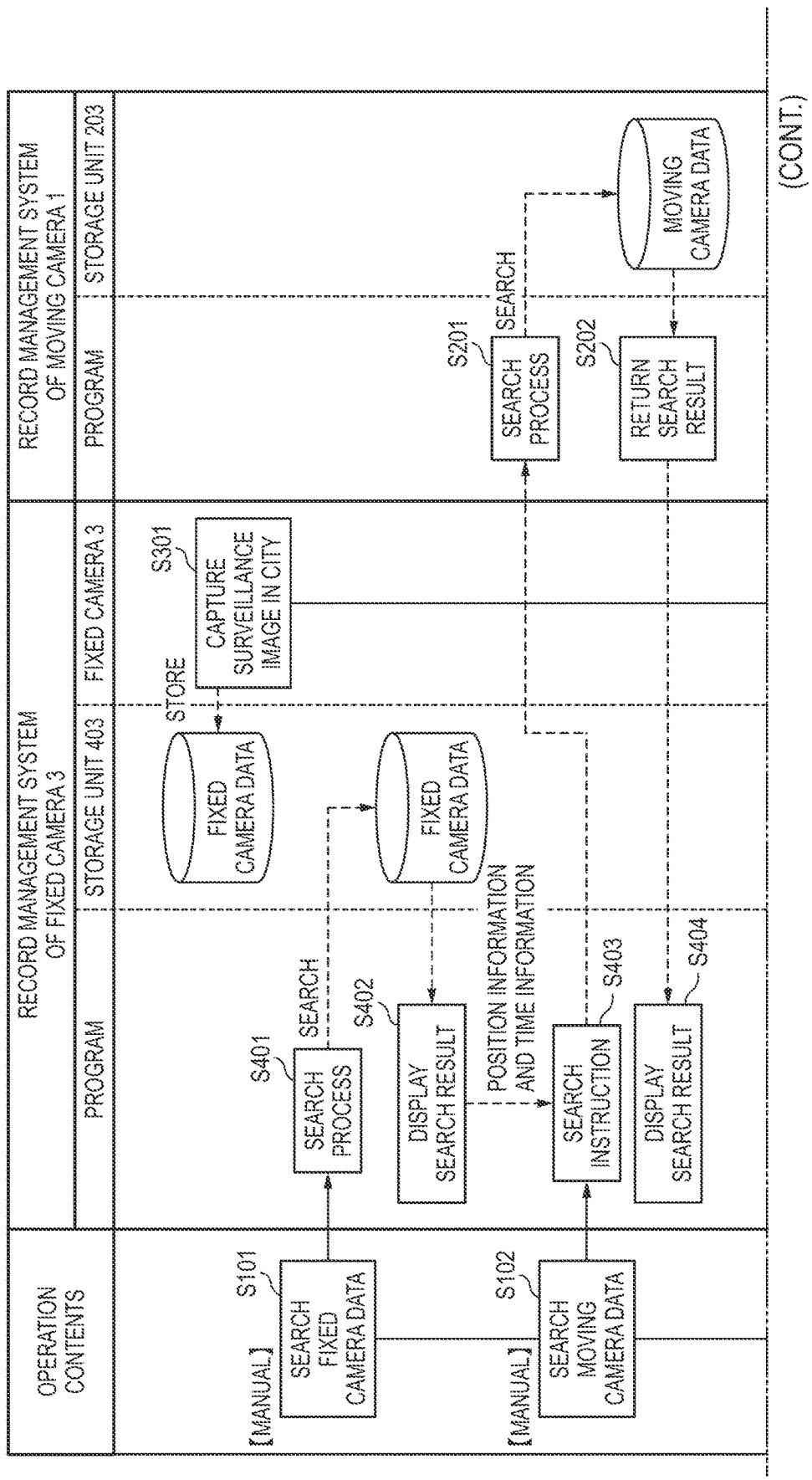
FIG. 12 shows an operation example of a record management system according to a second embodiment.

FIG. 12 shows an operation example of the record management system according to the second embodiment.

<Upload of Fixed Camera Data>

In FIG. 12, one or a plurality of the fixed cameras 3 are provided, for example, in a town. For example, the fixed camera 3 generates the fixed camera data, which is image data of an image (for example, surveillance image in a city) captured constantly (or periodically or aperiodically) (S301 and S302), and transmits (in other words, uploads) the fixed camera data to the server 4. The server 4 stores the fixed camera data in the storage unit 403. The fixed camera data stored in the server 4 may also include, for example, the position information indicating the position (for example, the installation position) where the fixed camera 3 captures the image, and the time information indicating the time when the fixed camera 3 captures the image (for example, date and time), in addition to the image data.

For example, the fixed camera data of each fixed camera 3 may be reproduced in real time in the terminal device 5. For example, the server 4 may generate screen data including the fixed camera data recorded in the storage unit 403 and transmit the screen data to the terminal device 5. The terminal device 5 may display the screen data received from the server 4.

Figure 13:
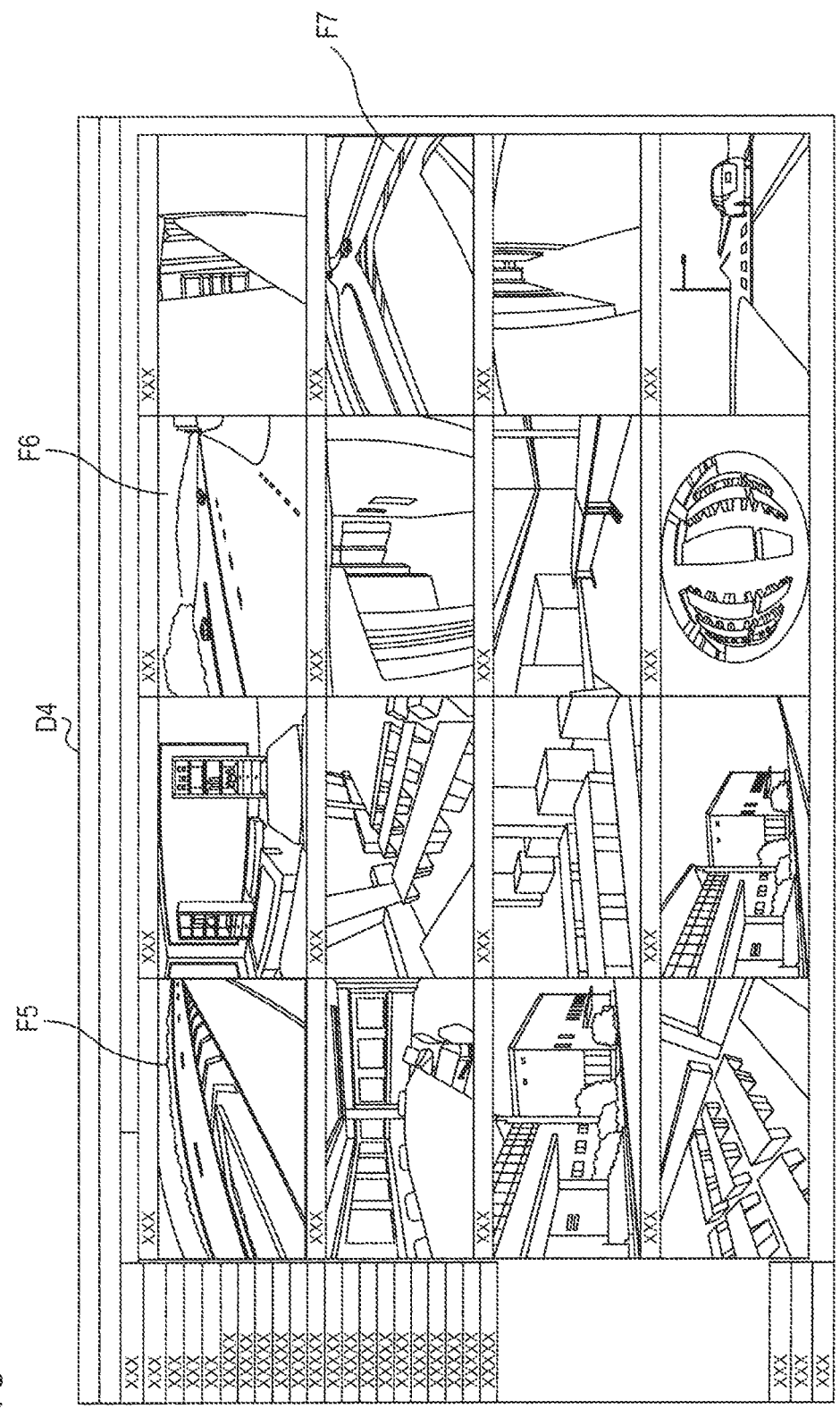
FIG. 13 shows an example of a management screen of the fixed camera data.

FIG. 13 shows an example of a fixed camera data management screen displayed on the terminal device 5. In a display screen D4 shown in FIG. 13, as an example, fixed camera data (for example, live image data) captured by 16 fixed cameras 3 are displayed in a tiled manner on one screen. In the fixed camera data management screen, the number of pieces of the fixed camera data displayed on the one screen is not limited to 16, and other numbers may also be acceptable. A display mode of the fixed camera data is not limited to the tile display, and other display modes (for example, list display) may also be employed. For example, the fixed camera data of the plurality of fixed cameras 3 may be sequentially switched and displayed on the fixed camera data management screen.

<Upload of Fixed Camera Data>

In FIG. 12, captured data (for example, moving camera data) captured by the moving camera 1 (for example, the in-vehicle camera 10 or the wearable camera 11) may be automatically or manually transmitted (in other words, uploaded) to the server 2 (for example, the storage unit 203) as in the first embodiment, for example (not shown). The moving camera data stored in the server 2 may also include, for example, the position information indicating the position where the moving camera 1 captures the image, and the time information indicating the time (for example, date and time) when the moving camera 1 captures the image, in addition to the image data.

<Search of Fixed Camera Data>

In FIG. 12, when the user U5 operates the terminal device 5 to give an instruction to search for the fixed camera data (S101), the terminal device 5 and the server 4 perform a fixed camera data search process (S401). For example, the terminal device 5 transmits the information related to the search process (for example, the search instruction or the search condition) input by the user U5 to the server 4. For example, the server 4 extracts the fixed camera data satisfying the search condition from the fixed camera data recorded in the storage unit 403.

Then, for example, the server 4 generates screen data including information related to the extracted fixed camera data (in other words, a search result), and transmits the screen data to the terminal device 5. The terminal device 5 displays the screen data received from the server 2 (S402).

Figure 14:
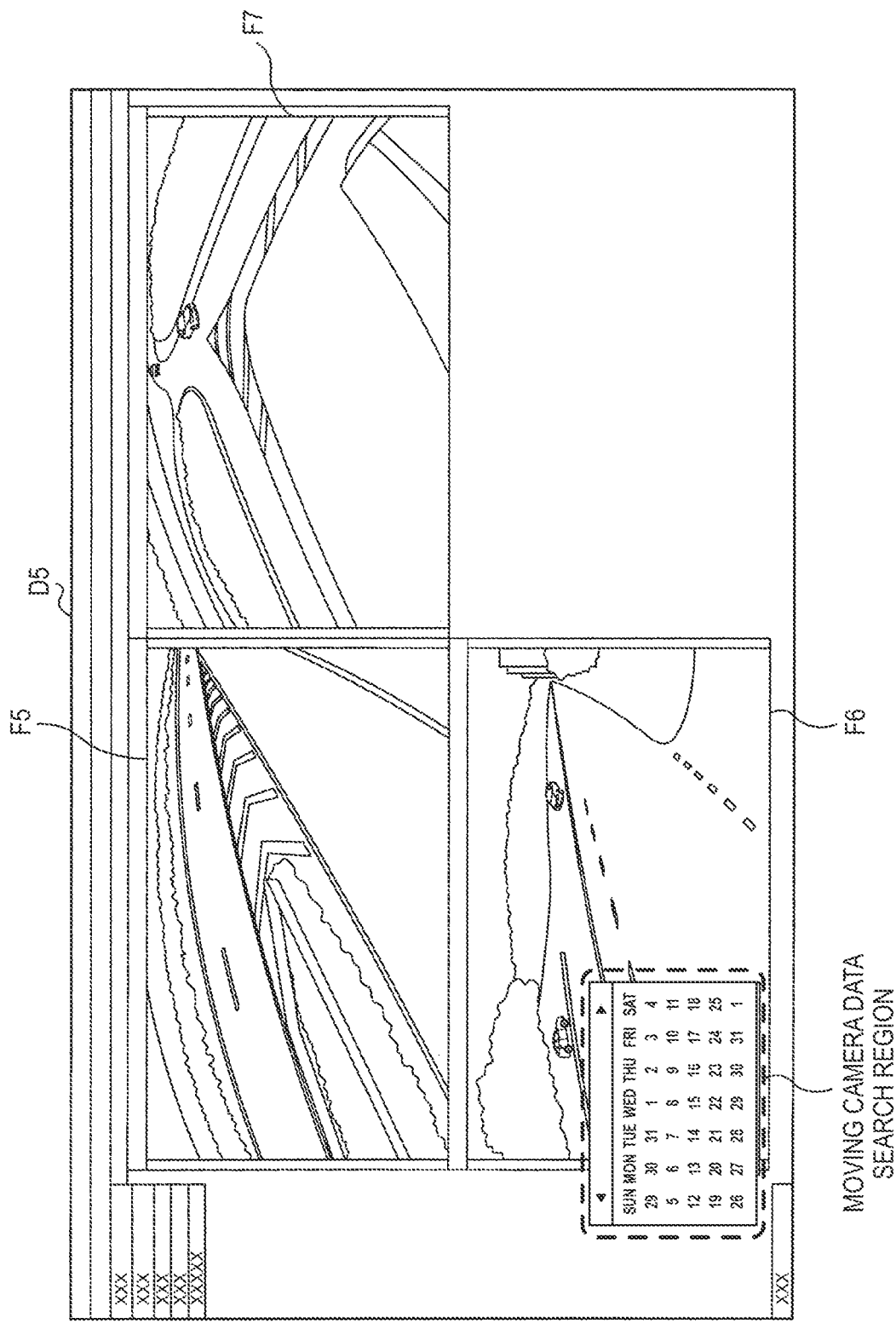
FIG. 14 shows an example of a search screen of the moving camera data.

FIG. 14 shows an example of a screen related to the search result of the fixed camera data displayed on the terminal device 5 when the user U5 selects fixed camera data F5, F6, and F7 in the management screen shown in FIG. 13, for example.

For example, the fixed camera data F5, F6, and F7 searched by the user U5 are displayed on a display screen D5 shown in FIG. 14. The display screen D5 shown in FIG. 14 includes, for example, a "moving camera data search region" for the user U5 to input or select the search condition to search for the moving camera data related to the fixed camera data. In the example shown in FIG. 14, a calendar for selecting a capturing date is displayed in the moving camera data search region. Display contents of the moving camera data search region is not limited to the calendar, and the user U5 may also be enabled to select or input the search condition of the moving camera data. For example, instead of selecting the date of the calendar, an input field for inputting capturing date and time may be displayed. An arrangement position of the moving camera data search region on the display screen is not limited to that of the example shown in FIG. 14, and other positions may also be acceptable.

<Search of Fixed Camera Data>

In FIG. 12, when the user U5 operates the terminal device 5 to give an instruction to search for the moving camera data (S102), the terminal device 5 and the server 4 instruct the server 2 to search for the moving camera data (S403), for example. For example, the terminal device 5 transmits information including a search instruction of the moving camera data related to the fixed camera data to the server 4, and the server 4 transmits the information including the search instruction of the moving camera data to the server 2. At this time, the search instruction information transmitted from the server 4 to the server 2 includes, for example, the position information related to the selected fixed camera data and the time information including the time selected by the user U5 (for example, the capturing date selected in FIG. 14).

Upon receiving the information including the search instruction of the moving camera data from the server 4, the server 2 performs a moving camera data search process (S201). For example, the server 2 extracts the moving camera data related to the fixed camera data from the moving camera data recorded in the storage unit 203 based on the position information and the time information indicated in the search instruction information.

For example, the server 2 may extract the moving camera data captured in an area corresponding to the installation position of the fixed camera 3 (in other words, a position where the fixed camera data is captured) indicated in the position information among a plurality of pieces of the moving camera data (in other words, images captured by the moving camera 1). The moving camera data related to the fixed camera data may be, for example, the moving camera data captured by the moving camera 1 at a position within a threshold from the installation position (in other words, the capturing position) of the fixed camera data. The threshold may be a fixed value or a variable value. In other words, the moving camera data related to the fixed camera data may be, for example, moving camera data captured by the moving camera 1 whose movement path includes the area corresponding to the fixed camera data to be searched by the user U5, for example.

For example, the server 2 may also extract (in other words, select) the moving camera data captured at the time indicated in the time information (for example, the capturing date or the capturing time) among a plurality of pieces of the moving camera data. The moving camera data related to the fixed camera data may be, for example, the moving camera data whose capturing time period includes the time indicated in the time information (for example, a time period from a capturing start time to a capturing end time).

In this way, the server 2 may extract the moving camera data captured at the same position and the same time as the fixed camera data among the moving camera data stored in the storage unit 203 based on the position information and the time information related to the fixed camera data, for example.

The server 2 transmits information indicating a search result of the moving camera data to the server 4 (S202). Based on the information indicating the search result of the moving camera data transmitted from the server 2, the server 4 generates screen data including the search result of the moving camera data and transmits the screen data to the terminal device 5. The terminal device 5 displays the screen data received from the server 2 (S404).

The search result of the moving camera data may include, for example, information for identifying the extracted moving camera data (for example, index information or access information) and metadata related to the moving camera data (for example, the position information and the time information). In other words, the search result of the moving camera data may at least include information related to the storage location of the searched moving camera data, and may not include the image data. Moreover, the server 4 may generate a thumbnail of the searched moving camera data, and may include the thumbnail in the screen data related to the search result.

Figure 15:
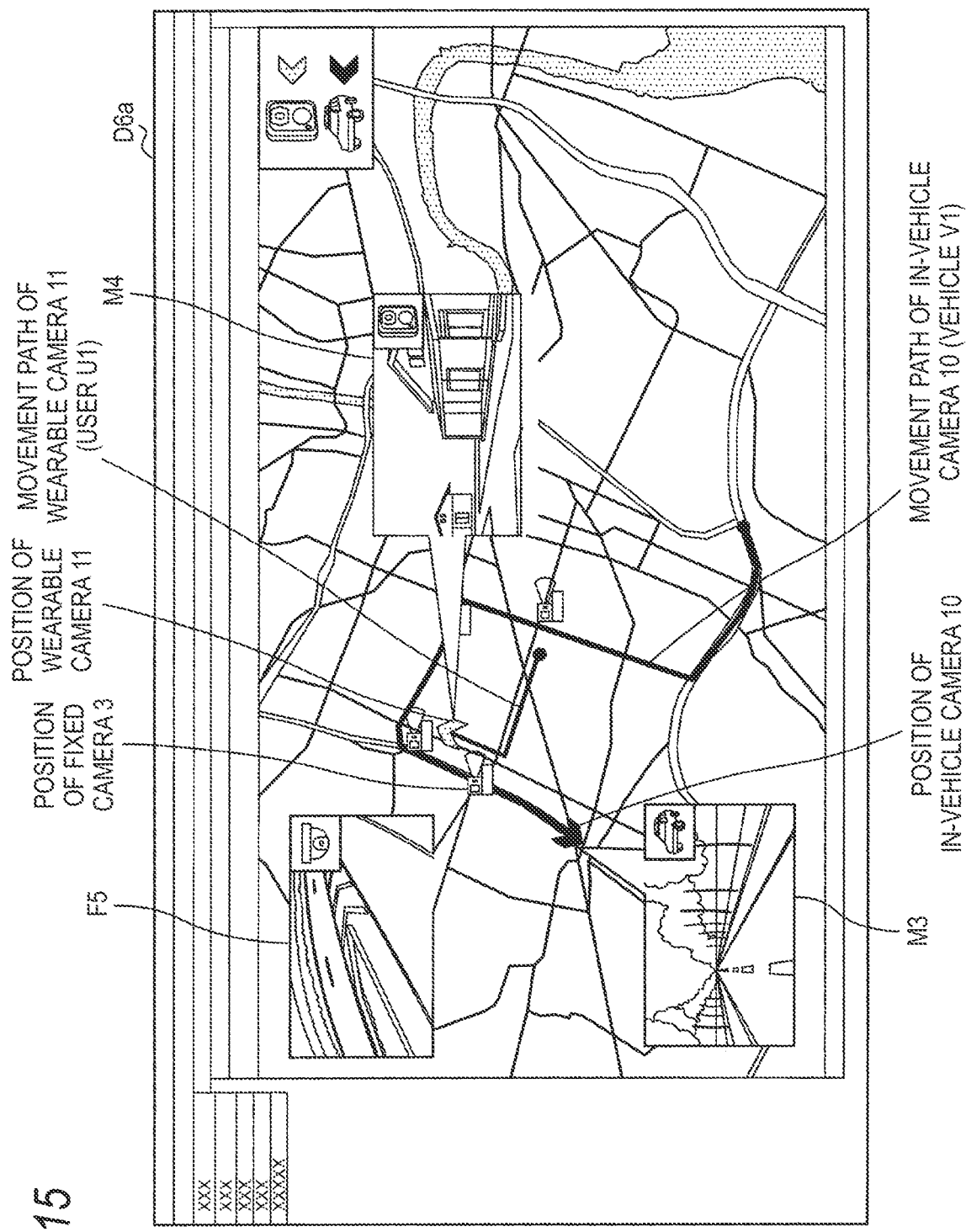
FIG. 15 shows an example of a screen displaying a search result of the moving camera data.
Figure 16:
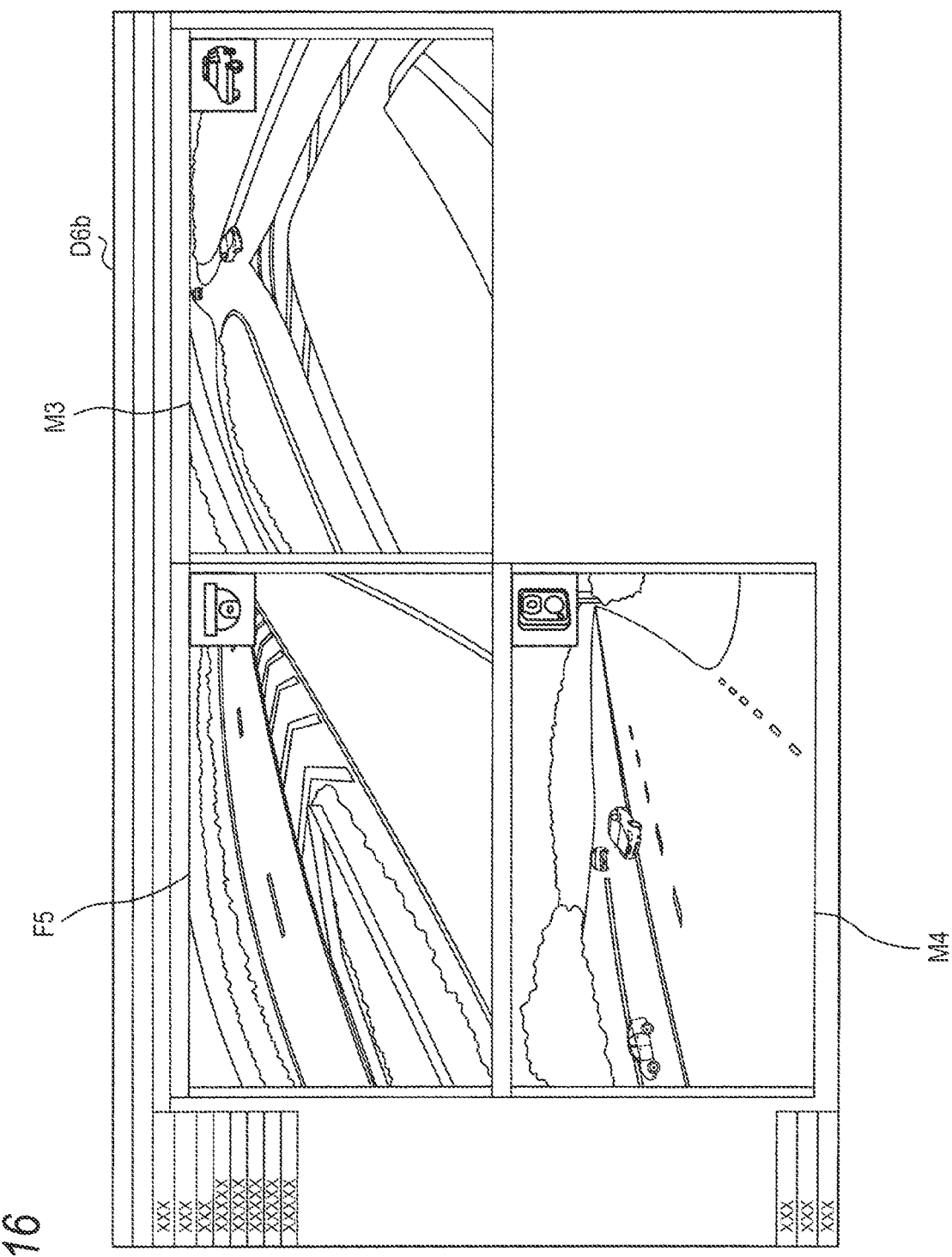
FIG. 16 shows the example of the screen displaying the search result of the moving camera data.

FIGS. 15 and 16 show an example of a screen related to the search result of the moving camera data displayed on the terminal device 5.

In FIGS. 15 and 16, as an example of the search result, the search result of the moving camera data in a case where one fixed camera data F5 is selected on the display screen D4 shown in FIG. 13 is shown. In FIGS. 15 and 16, for example, the selected fixed camera data F5 and moving camera data M3 and M4 (for example, thumbnails thereof) related to the fixed camera data F5 are displayed.

In a display screen D6a shown in FIG. 15, the position of the fixed camera 3, the movement path of the moving camera 1 (the in-vehicle camera 10 and the wearable camera 11), the fixed camera data F5 corresponding to the fixed camera 3, and the moving camera data M3, M4 corresponding to each moving camera 1 are displayed on a map. In a display screen D6b shown in FIG. 16, the fixed camera data F5 and the moving camera data M3 and M4 related to the fixed camera data F5 are displayed in a list. A display mode of the fixed camera data and the moving camera data on the display screen is not limited to the example shown in FIG. 16, and other display modes may also be employed.

<Reproduction of Image Data>

In FIG. 12, for example, when the user U5 selects the moving camera data to be reproduced from the search result of the moving camera data (S103), the terminal device 5 and the server 4 perform a preparation process of synchronous reproduction of the fixed camera data and the moving camera data (S405). For example, the terminal device 5 transmits information related to the fixed camera data and information related to the moving camera data selected by the user U5 to the server 4. For example, the server 4 extracts the corresponding fixed camera data (in other words, image data) from the storage unit 403 based on the information transmitted from the terminal device 5. The server 4 instructs the server 2 (for example, the storage unit 203) to extract the corresponding moving camera data (in other words, image data), and receives the moving camera data from the server 2. Then the server 4 generates screen data including a reproduction screen of the extracted fixed camera data and moving camera data, and transmits the screen data to the terminal device 5. The terminal device 5 synchronously reproduces the fixed camera data and the moving camera data based on the screen data received from the server 4 (S406).

For example, each piece of the moving camera data may be reproduced in synchronization with the capturing time of the fixed camera data. Due to such synchronous reproduction, for example, the user U5 that operates the terminal device 5 can simultaneously confirm the moving camera data of the moving camera 1 of the vehicle V1 or the user U1 which moves around the fixed camera 3 at the same time as the fixed camera data captured by the fixed camera 3.

Alternatively, when the moving camera 1 is located at a distance within the threshold from the position of the fixed camera 3 corresponding to the fixed camera data to be synchronously reproduced, the moving camera data may be reproduced in synchronization with the capturing time of the fixed camera data. In other words, the moving camera 1 to be reproduced may be switched in accordance with movement of each moving camera 1. By such switching, the user U5 that operates the terminal device 5 can simultaneously confirm image data from a plurality of viewpoints of the moving camera 1 and the fixed camera 3 at the installation position of the fixed camera 3, for example. In this case, the moving camera data corresponding to the moving camera 1 at a position away from the fixed camera 3 (for example, in an area whose distance from the fixed camera 3 is greater than the threshold) may not be reproduced. Therefore, for example, the amount of processing of the terminal device 5 can be reduced.

<Copy of Fixed Camera Data>

In FIG. 12, for example, the user U5 selects data to be stored in association with the moving camera data (in other words, stored image data) among the searched fixed camera data (S104). For example, the stored image data may be fixed camera data searched by an operation of S101 shown in FIG. 12, or may be fixed camera data corresponding to the moving camera data selected by the user U5 by an operation of S103 shown in FIG. 12.

The terminal device 5 and the server 4 perform a process of copying the selected stored image data to the server 2 (in other words, the record management system of the moving camera 1) (S407). For example, the terminal device 5 transmits information related to the selected stored image data to the server 4. For example, the server 4 extracts the fixed camera data from the storage unit 403 based on the information related to the stored image data transmitted from the terminal device 5, and transmits the extracted fixed camera data to the server 2. The fixed camera data transmitted to the server 2 is stored in the storage unit 203, for example.

Therefore, the fixed camera data related to the moving camera data, which is reproduced synchronously, is copied from the storage device in the record management system of the fixed camera 3 (for example, the storage unit 403 of the server 4) to the storage device in the record management system of the moving camera 1 (for example, the storage unit 203 of the server 2). A copy destination of the fixed camera data is not limited to the server 2, and may also be, for example, another storage device in the record management system of the moving camera 1.

For example, in the record management system of the fixed camera 3, the fixed camera data can be assumed to be deleted (in other words, erased) in the server 4 after a certain period (for example, 30 days or 60 days) has elapsed. Even in this case, due to the above-described copy process (for example, the processes of S104 and S407 shown in FIG. 12), the fixed camera data related to the moving camera data is stored in the server 2. Therefore, even after the corresponding fixed camera data is deleted in the record management system of the fixed camera 3, the user U5 can reproduce the fixed camera data stored in the record management system of the moving camera 1.

The operation example of the record management system has been described above.

In the record management system according to the second embodiment, the server 4 selects an image related to an image of the fixed camera 3 from images captured by the moving camera 1 based on the position where the fixed camera 3 captures the image and the time when the fixed camera 3 captures the image. Then the server 4 reproduces (for example, synchronously reproduces) the image of the fixed camera 3 and the image of the moving camera 1 based on respective capturing times thereof.

Therefore, by selecting the fixed camera data, the user U5 can confirm the moving camera data related to the fixed camera data in addition to the selected fixed camera data, for example. In other words, in the record management system, since the user U5 does not need to separately search for the fixed camera data and the moving camera data, the convenience of the record management system can be improved.

In the present embodiment, the server 4 copies, for example, the fixed camera data corresponding to the searched moving camera data into the record management system of the moving camera 1 (for example, the server 2). In the record management system of the fixed camera 3, for example, even after the fixed camera data is deleted after a certain period of time has elapsed since the fixed camera data is captured, the user U5 can confirm the fixed camera data related to the moving camera data due to such copying, so that the convenience of the record management system can be improved.

Figure 17:
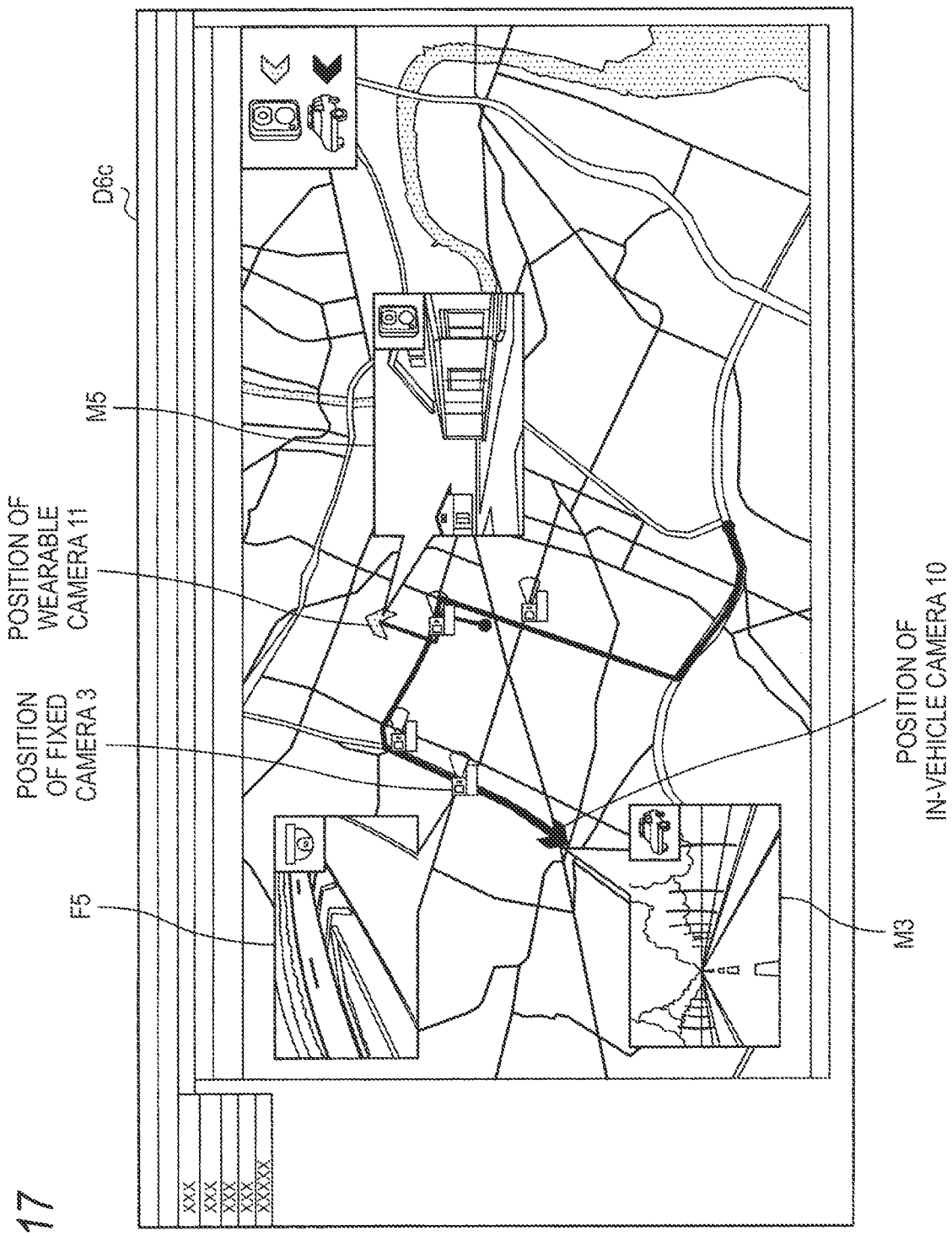
FIG. 17 shows the example of the screen displaying the search result of the moving camera data.

In FIG. 15, as an example, a case where the moving camera data M3 and M4 captured in an area around the installation position of the fixed camera 3 corresponding to the fixed camera data F5 are searched has been described. However, the moving camera data related to the fixed camera data is not limited thereto, and, for example, as shown in FIG. 17, moving camera data M5 which is captured at the capturing time of the fixed camera data may also be included. In this case, the user U5 can simultaneously confirm the moving camera data M5 which is captured at another location at the same time as the capturing time of the fixed camera data F5, for example.

For example, in FIG. 12, a case where the search of the moving camera data (for example, the processes of S201, S202, S403, and S404) is performed and the reproduction is started (for example, the processes of S405 and S406) in accordance with the operation performed by the user U5 on the terminal device 5 (for example, the operations of S102 and S103) has been described. However, the present invention is not limited thereto, and for example, the search of the moving camera data and the process of starting the reproduction may be automatically performed by the server 4. Automatic moving camera data search and reproduction start process may be started, for example, at timing when an operation including the search of the moving camera data (for example, input or selection of the search condition) is performed in the fixed camera data search process in S101 shown in FIG. 12.

The respective embodiments have been described above.

Although cases where the moving camera data and the fixed camera data are synchronously reproduced in the record management system have been described in the above embodiments, the present invention is not limited thereto. The terminal device 5 may also reproduce the moving camera data and the fixed camera data at different times, for example. For example, based on the position where one image data of the moving camera data and the fixed camera data has been captured, the record management system may select the other image data related to the one image data. By such a process, the user U5 can confirm the other image data in a different time period around the capturing location of the one image data, for example, at the time of reproducing the one image data of the moving camera data and the fixed camera data.

In the above embodiments, cases where the image data captured by the moving camera 1 and the fixed camera 3 is managed in the record management system have been described. However, information managed by the record management system is not limited to the image data, and may also include, for example, audio data and still picture data.

The above-described embodiments may also be combined. For example, by combining the first embodiment and the second embodiment, the user U5 can search the image data of one of the moving camera data and the fixed camera data and thus synchronously reproduce the other image data related to the one image data.

The present disclosure may be realized by software, hardware, or software linked with hardware. Each functional block used in the description of the above embodiment may be partially or entirely realized as an LSI which is an integrated circuit, and each process described in the above embodiment may be partially or entirely controlled by a single LSI or a combination of LSIs. The LSI may be provided with individual chips, or may be provided with one chip so as to include a part or all of the functional blocks. The LSI may include data input and output. The LSI may be referred to as an IC, a system LSI, a super LSI, or an ultra LSI depending on a degree of integration. The method of circuit integration is not limited to the LSI, and may also be realized by a dedicated circuit, a general-purpose processor, or a dedicated processor. A field programmable gate array (FPGA) which can be programmed after manufacturing of the LSI or a reconfigurable processor which can reconfigure the connection and settings of circuit cells inside the LSI may be used. The present disclosure may be realized as digital processing or analog processing. Further, if an integrated circuit technology that replaces the LSI emerges due to a progress of a semiconductor technology or another derivative technology, the technology may naturally be used to integrate the functional blocks. Application of biotechnology or the like may also be possible.

A program describing processing contents of functions to be provided by the server 2 and the server 4 is provided. By executing the program on a computer, the above-described processing function (reproduction control method) is realized on the computer.

INDUSTRIAL APPLICABILITY

One example of the present disclosure is useful for a system that manages image data.

What is claimed is:

1. An information processing device comprising:
    selection circuitry configured to:
        select a first image generated by a movable camera that is an in-vehicle camera or a wearable camera, the first image being associated with position information of the movable camera and time information of the movable camera, the position information of the movable camera indicating a position where the movable camera captured the first image, the time information of the movable camera indicating a time when the movable camera captured the first image, and
        select a second image generated by a fixed camera that is affixed to a stationary object, the second image being selected based on the position information of the movable camera and the time information of the movable camera; and
    display circuitry configured to reproduce the first image and the second image on a display.
2. The information processing device according to claim 1,
    wherein the second image is selected in a case where the fixed camera is located at a distance within a threshold from the position where the movable camera captured the first image.

3. The information processing device according to claim 1,
    wherein the second image is selected in a case where the fixed camera is located at a distance within a threshold from each of a plurality of positions located on a movement trajectory of the movable camera.
4. The information processing device according to claim 3,
    wherein the first image is recorded in a memory in a first system, and the second image is recorded in a memory in a second system different from the first system, and
    the second image is copied from the memory in the second system to the memory in the first system.
5. The information processing device according to claim 4,
    wherein the first system is a system in which deletion of an image recorded in the memory in the first system is restricted.
6. The information processing device according to claim 1,
    wherein the selection circuitry is configured to select a third image generated by another movable camera that is an in-vehicle camera or a wearable camera, the another movable being at a position within a threshold from an installation position of the fixed camera.
7. The information processing device according to claim 6,
    wherein the first and third images are recorded in a memory in a first system, and the second image is recorded in a memory in a second system different from the first system, and
    the second image is copied from the memory in the second system to the memory in the first system.
8. The information processing device according to claim 7,
    wherein the first system is a system in which deletion of an image recorded in the memory in the first system is restricted.
9. A reproduction control method of an information processing device, the reproduction control method including:
    selecting a first image generated by a movable camera that is an in-vehicle camera or a wearable camera, the first image being associated with position information of the movable camera and time information of the movable camera, the position information of the movable camera indicating a position where the movable camera captured the first image, the time information of the movable camera indicating a time when the movable camera captured the first image;
    selecting a second image generated by a fixed camera that is affixed to a stationary object, the second image being selected based on the position information of the movable camera and the time information of the movable camera; and
    reproducing the first image and the second image on a display.
10. The information processing device according to claim 1,
    wherein the display circuitry is configured to generate a display screen on the display, and
    the display screen includes a moving camera data display region including the first image, a moving camera data operation region including inputs for operations related to the movable camera, and a fixed camera data search input configured to initiate the selection of the second image.

11. The information processing device according to claim 10,
   wherein the display screen include a fixed camera data search result display region including the second image.

12. The information processing device according to claim 1,
   wherein the first image and the second image are reproduced on the display concurrently.

* * * * *